(12) United States Patent
Kim et al.

(10) Patent No.: US 11,987,095 B2
(45) Date of Patent: May 21, 2024

(54) INTEGRATED THERMAL MANAGEMENT SYSTEM FOR VEHICLE

(71) Applicants: Hyundai Motor Company, Seoul (KR); Kia Corporation, Seoul (KR)

(72) Inventors: Ki Mok Kim, Busan (KR); Man Ju Oh, Yongin-si (KR); Sang Shin Lee, Suwon-si (KR); Won Seok Sung, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/932,330

(22) Filed: Sep. 15, 2022

(65) Prior Publication Data

US 2023/0182534 A1 Jun. 15, 2023

(30) Foreign Application Priority Data

Dec. 15, 2021 (KR) .......................... 10-2021-0179805

(51) Int. Cl.
*B60H 1/00* (2006.01)
*B60L 58/26* (2019.01)
(Continued)

(52) U.S. Cl.
CPC ..... *B60H 1/00899* (2013.01); *B60H 1/00278* (2013.01); *B60L 58/26* (2019.02);
(Continued)

(58) Field of Classification Search
CPC ............ B60H 1/00899; B60H 1/00278; B60H 2001/00307; B60H 2001/00908;
(Continued)

(56) References Cited

U.S. PATENT DOCUMENTS

2016/0107501 A1* 4/2016 Johnston ............ B60H 1/00278
165/41
2018/0117985 A1* 5/2018 Kim ....................... B60H 3/024
(Continued)

FOREIGN PATENT DOCUMENTS

KR 20190124032 A 11/2019

*Primary Examiner* — Len Tran
*Assistant Examiner* — Gustavo A Hincapie Serna
(74) *Attorney, Agent, or Firm* — MCDONNELL BOEHNEN HULBERT & BERGHOFF LLP

(57) ABSTRACT

Disclosed is an integrated thermal management system for a vehicle including a refrigerant flow line extending to allow a refrigerant discharged from a compressor to flow in the order of an indoor condenser, an external condenser, and an evaporator and to flow back to the compressor, a refrigerant chiller line branching from the refrigerant flow line at each of the points downstream of the compressor, the indoor condenser, or the external condenser, the refrigerant chiller line joining the refrigerant flow line at a point upstream of the compressor after the refrigerant passes through a battery chiller and an electric chiller or bypasses the same, a battery cooling line extending to allow a coolant to circulate while passing through a battery radiator or the battery chiller, and an electric cooling line extending to allow a coolant to circulate while passing through an electric radiator or the electric chiller.

14 Claims, 22 Drawing Sheets

(51) Int. Cl.
*B60L 58/27* (2019.01)
*H01M 10/613* (2014.01)
*H01M 10/615* (2014.01)
*H01M 10/625* (2014.01)
*H01M 10/6568* (2014.01)
*H01M 10/6569* (2014.01)

(52) U.S. Cl.
CPC ........... *B60L 58/27* (2019.02); *H01M 10/613* (2015.04); *H01M 10/615* (2015.04); *H01M 10/625* (2015.04); *H01M 10/6568* (2015.04); *H01M 10/6569* (2015.04); *B60H 2001/00307* (2013.01); *B60H 2001/00928* (2013.01); *H01M 2220/20* (2013.01)

(58) Field of Classification Search
CPC ................ B60H 1/32281; B60H 1/323; B60H 1/00885; B60L 58/26; B60L 58/27; H01M 10/613; H01M 10/615; H01M 10/625; H01M 10/6568; H01M 10/6569; H01M 2220/20
USPC .......................................................... 62/239

See application file for complete search history.

(56) References Cited

U.S. PATENT DOCUMENTS

| | | | | |
|---|---|---|---|---|
| 2019/0381857 | A1* | 12/2019 | Lee | H01M 10/613 |
| 2020/0031193 | A1* | 1/2020 | Lee | H01M 10/6567 |
| 2020/0353793 | A1* | 11/2020 | Choi | F25B 25/005 |
| 2020/0361280 | A1* | 11/2020 | Hashimoto | B60H 1/00428 |
| 2020/0369108 | A1* | 11/2020 | Kim | B60H 1/00921 |
| 2021/0370747 | A1* | 12/2021 | Lee | B60H 1/00278 |
| 2022/0144039 | A1* | 5/2022 | Benouali | B60H 1/00921 |
| 2022/0176774 | A1* | 6/2022 | Tang | B60H 1/3227 |
| 2022/0181722 | A1* | 6/2022 | Kim | F01P 7/14 |
| 2022/0258570 | A1* | 8/2022 | Ishizeki | B60H 1/00385 |
| 2022/0314737 | A1* | 10/2022 | Hwang | F01P 11/029 |
| 2022/0324292 | A1* | 10/2022 | Cagliero | H01M 10/663 |
| 2022/0402336 | A1* | 12/2022 | Tada | B60H 1/3205 |
| 2022/0410653 | A1* | 12/2022 | Li | B60H 1/00885 |
| 2023/0118870 | A1* | 4/2023 | Eser | B60K 11/02 165/96 |
| 2023/0137140 | A1* | 5/2023 | Yamashita | B60H 1/00885 62/244 |
| 2023/0322048 | A1* | 10/2023 | Durrani | F25B 25/005 62/115 |
| 2023/0339293 | A1* | 10/2023 | Durrani | B60H 1/00921 |
| 2023/0364969 | A1* | 11/2023 | Maeda | B60H 1/32284 |
| 2023/0373271 | A1* | 11/2023 | You | B60H 1/00485 |
| 2023/0382187 | A1* | 11/2023 | Höfler | B60H 1/32281 |

* cited by examiner

INTEGRATED THERMAL MANAGEMENT SYSTEM FOR VEHICLE

CROSS-REFERENCE TO RELATED APPLICATIONS

This application claims priority from Korean Patent Application No. 10-2021-0179805, filed on Dec. 15, 2021, in the Korean Intellectual Property Office, the disclosure of which is incorporated herein by reference in its entirety.

TECHNICAL FIELD

The present disclosure relates to an integrated thermal management system for a vehicle in which a battery chiller and an electric chiller are provided so that cooling, heating, and battery heating through a heat pump may be independently performed according to a thermal management mode of the vehicle.

BACKGROUND

Recently, the number of eco-friendly vehicles has increased due to policies encouraging the proliferation of eco-friendly vehicles and the preference for high-efficiency vehicles. An electric vehicle, which is a type of eco-friendly vehicle, is a vehicle operated using an electric battery and an electric motor without using petroleum or an engine. Since the electric vehicle has a system that drives the vehicle by rotating the motor using electricity stored in the battery, the electric vehicle does not emit harmful substances, and is quiet and highly efficient.

In the case of a vehicle using engine power of the related art, an in-vehicle heating system is operated using waste heat of an engine. However, since an electric vehicle does not have an engine, the electric vehicle has a system that uses electricity to operate a heater. Accordingly, the electric vehicle has a problem in that range is significantly reduced while the heater is running.

In addition, the battery module should be used in an optimal temperature environment in order to maintain optimal performance and long life thereof. However, it is difficult to use the battery module in such an optimal temperature environment due to heat generated during driving and external temperature changes.

In order to solve the above-described problems, a method of combining an air-conditioning system of the electric vehicle and a thermal management system thereof is being actively discussed.

Meanwhile, in the case of a thermal management circuit of the related art using an integrated chiller that exchanges heat with an electronic driving unit and a battery, the number of components is reduced, thereby having an effect of reducing material cost. However, when the battery temperature is raised in winter, a heat pump of a refrigerant cannot be used and only a PTC heater is used to heat the passenger compartment, which leads to a problem in electricity consumption efficiency.

The information disclosed in this Background section is only for enhancement of understanding of the general background of the present disclosure, and should not be taken as an acknowledgement or any form of suggestion that this information forms the related art already known to a person skilled in the art.

SUMMARY

Therefore, the present disclosure has been made in view of the above problems, and it is an object of the present disclosure to provide an integrated thermal management system for a vehicle capable of performing indoor heating through a heat pump even when battery temperature is raised by including a battery chiller and an electric chiller separated from each other.

In accordance with the present disclosure, the above and other objects can be accomplished by the provision of an integrated thermal management system for a vehicle including a refrigerant flow line extending to allow a refrigerant discharged from a compressor to flow in the order of an indoor condenser, an external condenser, and an evaporator and to flow back to the compressor, a refrigerant chiller line branching from the refrigerant flow line at a point downstream of the compressor, a point downstream of the indoor condenser, or a point downstream of the external condenser, the refrigerant chiller line joining the refrigerant flow line at a point upstream of the compressor after the refrigerant, flowing in each of the refrigerant chiller lines branching therefrom, passes through a battery chiller and an electric chiller or bypasses the battery chiller and the electric chiller, a battery cooling line extending to allow a coolant, passing through a battery and being discharged therefrom, to circulate while passing through a battery radiator or the battery chiller, and an electric cooling line extending to allow a coolant, passing through an electric component and being discharged therefrom, to circulate while passing through an electric radiator or the electric chiller.

The refrigerant flow line may include a first expansion valve configured to expand the refrigerant and to permit or block flow of the refrigerant at a point upstream of the external condenser, and a second expansion valve configured to expand the refrigerant and to permit or block flow of the refrigerant at a point upstream of the evaporator, and the refrigerant chiller line may include a third expansion valve configured to expand the refrigerant and to permit or block flow of the refrigerant at a point upstream of the battery chiller, and a fourth expansion valve configured to expand the refrigerant and to permit or block flow of the refrigerant at a point upstream of the electric chiller.

The refrigerant chiller line may include an integrated valve connected to the point downstream of the compressor, the point downstream of the indoor condenser, or the point downstream of the external condenser so that the refrigerant in the refrigerant flow line flows thereinto, and connected to the point upstream of the compressor by passing through or bypassing the battery chiller and the electric chiller so that the refrigerant flowing thereinto is discharged to the refrigerant flow line. The integrated thermal management system may further include a controller configured to control operation of the compressor, to control the integrated valve to regulate flow of the refrigerant in the refrigerant flow line or the refrigerant chiller line, and to control flow of the coolant in the battery cooling line or the electric cooling line.

The controller, in a battery heating mode, may permit flow of the coolant so that the coolant, passing through the battery and being discharged therefrom in the battery cooling line, circulates while passing through the battery chiller, and may control the integrated valve so that the refrigerant in the refrigerant flow line flows into the refrigerant chiller line at the point downstream of the indoor condenser or at the point downstream of the compressor and is discharged to the refrigerant flow line at the point upstream of the compressor via the battery chiller and the electric chiller through the refrigerant chiller line.

The controller may expand the refrigerant at a point upstream of the evaporator on the refrigerant flow line to absorb heat from indoor air, may expand the refrigerant at a point upstream of the external condenser on the refrigerant flow line to absorb heat from outside air, or may expand the refrigerant at a point upstream of the electric chiller on the refrigerant chiller line to absorb waste heat of the electric component.

The controller, in an electric waste heat absorption heating mode, may permit flow of the coolant so that the coolant, passing through the electric component and being discharged therefrom in the electric cooling line, circulates while passing through the electric chiller, may control the integrated valve so that the refrigerant in the refrigerant flow line flows into the refrigerant chiller line at the point downstream of the indoor condenser or at the point downstream of the external condenser and is discharged to the refrigerant flow line at the point upstream of the compressor via the battery chiller and the electric chiller through the refrigerant chiller line, and may absorb waste heat of the electric component by expanding the refrigerant at a point upstream of the electric chiller on the refrigerant chiller line.

The controller, in an outdoor air heat absorption heating mode, may control the integrated valve so that the refrigerant in the refrigerant flow line flows into the refrigerant chiller line at the point downstream of the external condenser and bypasses the battery chiller and the electric chiller through the refrigerant chiller line to be discharged to the refrigerant flow line at the point upstream of the compressor, and may absorb heat from outside air by expanding the refrigerant at a point upstream of the external condenser on the refrigerant chiller line.

The controller, in a battery waste heat absorption heating mode, may permit flow of the coolant so that the coolant, passing through the battery and being discharged therefrom in the battery cooling line, circulates while passing through the battery chiller, may control the integrated valve so that the refrigerant in the refrigerant flow line flows into the refrigerant chiller line at the point downstream of the indoor condenser or at the point downstream of the external condenser and is discharged to the refrigerant flow line at the point upstream of the compressor via the battery chiller and the electric chiller through the refrigerant chiller line, and may absorb waste heat of the battery by expanding the refrigerant at a point upstream of the battery chiller on the refrigerant chiller line.

The refrigerant chiller line may branch from the refrigerant flow line at the point downstream of the indoor condenser and the point downstream of the external condenser, respectively, and the refrigerant, flowing in each of the refrigerant chiller lines branching therefrom, may join the point upstream of the compressor by passing through or bypassing the battery chiller and the electric chiller, so that the indoor condenser is connected in series with the battery chiller and the electric chiller.

The refrigerant chiller line may branch from the refrigerant flow line at the point downstream of the compressor and the point downstream of the external condenser, respectively, and the refrigerant, flowing in each of the refrigerant chiller lines branching therefrom, may pass through or bypass the battery chiller and the electric chiller to join the point upstream of the compressor, so that the indoor condenser is connected in parallel with the battery chiller and the electric chiller.

The refrigerant chiller line may include an integrated valve connected to the point downstream of the compressor and the point downstream of the external condenser so that the refrigerant in the refrigerant flow line flows thereinto, and connected to the point upstream of the compressor by passing through or bypassing the battery chiller and the electric chiller so that the refrigerant flowing thereinto is discharged to the refrigerant flow line. The integrated thermal management system may further include a controller configured to control operation of the compressor, to control the integrated valve to regulate flow of the refrigerant in the refrigerant flow line or the refrigerant chiller line, and to control flow of the coolant in the battery cooling line or the electric cooling line. The controller, in a battery heating mode, may permit flow of the coolant so that the coolant, passing through the battery and being discharged therefrom in the battery cooling line, circulates while passing through the battery chiller, and may control the integrated valve so that the refrigerant in the refrigerant flow line flows into the refrigerant chiller line by bypassing the indoor condenser at the point downstream of the compressor and is discharged to the refrigerant flow line at the point upstream of the compressor via the battery chiller and the electric chiller through the refrigerant chiller line.

The refrigerant chiller line may branch from the refrigerant flow line at the point downstream of the compressor, the point downstream of the indoor condenser, and the point downstream of the external condenser, respectively, and the refrigerant, flowing in each of the refrigerant chiller lines branching from the point downstream of the compressor and the point downstream of the indoor condenser, may join the point upstream of the compressor by selectively passing through or bypassing the battery chiller and the electric chiller through a series-parallel valve, so that the indoor condenser is selectively connected in series or in parallel with the battery chiller and the electric chiller.

The refrigerant chiller line may include an integrated valve connected to the series-parallel valve and the point downstream of the external condenser so that the refrigerant in the refrigerant flow line flows thereinto, and connected to the point upstream of the compressor by passing through or bypassing the battery chiller and the electric chiller so that the refrigerant flowing thereinto is discharged to the refrigerant flow line. The integrated thermal management system may further include a controller configured to control operation of the compressor, to control the integrated valve to regulate flow of the refrigerant in the refrigerant flow line or the refrigerant chiller line, and to control flow of the coolant in the battery cooling line or the electric cooling line. The controller, in a battery waste heat absorption heating mode, may permit flow of the coolant so that the coolant, passing through the battery and being discharged therefrom in the battery cooling line, circulates while passing through the battery chiller, may control the series-parallel valve so that the refrigerant in the refrigerant flow line flows into the refrigerant chiller line at the point downstream of the indoor condenser, may control the integrated valve so that the refrigerant, flowing thereinto through the series-parallel valve, is discharged to the refrigerant flow line at the point upstream of the compressor via the battery chiller and the electric chiller, and may absorb waste heat of the battery by expanding the refrigerant at a point upstream of the battery chiller on the refrigerant chiller line.

The controller may cause the refrigerant discharged from the compressor in the refrigerant flow line to sequentially flow to the indoor condenser, the external condenser, and the evaporator, and may expand the refrigerant at a point upstream of the external condenser or at a point upstream of the evaporator in the refrigerant flow line to absorb heat from outside air or to absorb heat from indoor air.

The refrigerant chiller line may include an integrated valve connected to the series-parallel valve and the point downstream of the external condenser so that the refrigerant in the refrigerant flow line flows thereinto, and connected to the point upstream of the compressor by passing through or bypassing the battery chiller and the electric chiller so that the refrigerant flowing thereinto is discharged to the refrigerant flow line. The integrated thermal management system may further include a controller configured to control operation of the compressor, to control the integrated valve to regulate flow of the refrigerant in the refrigerant flow line or the refrigerant chiller line, and to control flow of the coolant in the battery cooling line or the electric cooling line. The controller, in a battery heating mode, may permit flow of the coolant so that the coolant, passing through the battery and being discharged therefrom in the battery cooling line, circulates while passing through the battery chiller, may control the series-parallel valve so that the refrigerant in the refrigerant flow line flows into the refrigerant chiller line by bypassing the indoor condenser at the point downstream of the compressor, may control the integrated valve so that the refrigerant, flowing into the refrigerant chiller line through the series-parallel valve, is discharged to the refrigerant flow line at the point upstream of the compressor via the battery chiller and the electric chiller, and may absorb waste heat of the electric component by expanding the refrigerant at a point upstream of the electric chiller on the refrigerant chiller line.

The controller may permit the flow of the coolant so that the coolant, passing through the electric component and being discharged therefrom in the electric cooling line, circulates while passing through the electric chiller, may control the series-parallel valve so that the refrigerant, discharged from the compressor on the refrigerant flow line, flows into the refrigerant chiller line via the indoor condenser, may control the integrated valve so that the refrigerant, flowing into the refrigerant chiller line through the series-parallel valve, is discharged to the refrigerant flow line at the point upstream of the compressor via the battery chiller and the electric chiller, and may absorb the waste heat of the electric component by expanding the refrigerant at the point upstream of the electric chiller on the refrigerant chiller line.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Figure 1:
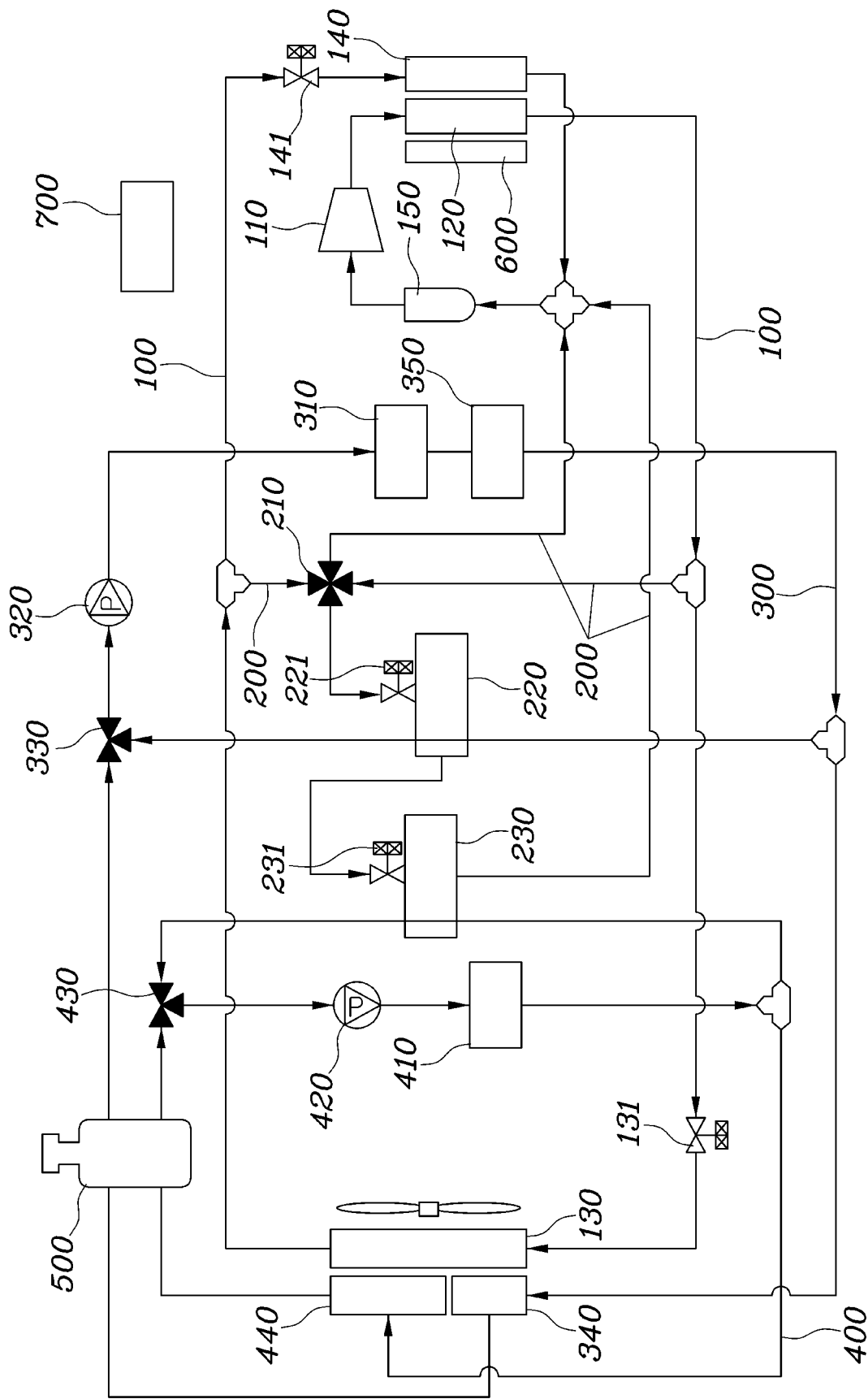
FIG. 1 shows a circuit diagram of an integrated thermal management system for a vehicle according to an embodiment of the present disclosure.

Specific structural or functional descriptions in the embodiments of the present disclosure disclosed in this specification or application are merely illustrative for the purpose of describing embodiments according to the present disclosure. Further, the present disclosure may be implemented in various forms and should not be construed as being limited to the embodiments described in this specification or application.

Since the embodiments according to the present disclosure may have various modifications and may have various forms, specific embodiments are illustrated in the drawings and described in detail in this specification or application.

However, it should be understood that the embodiments according to the concept of the present disclosure are not intended to be limited to specific disclosed forms, and include all modifications, equivalents, and substitutes included in the spirit and technical scope of the present disclosure.

Meanwhile, in the present disclosure, terms such as first and/or second may be used to describe various components, but the components are not limited by the terms. The terms are used only for the purpose of distinguishing one component from other components. For example, a first component may be referred as a second component, and similarly, a second component may also be referred to as a first component without departing from the scope of rights according to the concept of the present disclosure.

When one component is referred to as being "connected" or "joined" to another component, the one component may be directly connected or joined to the other component, but it should be understood that other components may be present therebetween. On the other hand, when the one component is referred to as being "directly connected to" or "directly in contact with" the other component, it should be understood that other components are not present therebetween. Other expressions for the description of a relationship between components, that is, "between" and "directly between" or "adjacent to" and "directly adjacent to", should be interpreted in the same manner.

The terms used in the specification are only used to describe specific embodiments, and are not intended to limit the present disclosure. In this specification, an expression in a singular form also includes the plural form, unless otherwise clearly specified in context. It should be understood that expressions such as "comprise" and "have" in this specification are intended to designate the presence of embodied features, numbers, steps, operations, components, parts, or combinations thereof, but do not exclude the presence or addition of one or more other features, numbers, steps, operations, components, parts, or combinations thereof.

Unless otherwise defined, all terms used herein, including technical and scientific terms, have the same meanings as those commonly understood by those skilled in the art to which the present disclosure pertains. Terms such as those defined in commonly used dictionaries should be interpreted as having meanings consistent with their meanings in the context of the related technology. Further, unless explicitly defined in this specification, the above-mentioned terms should not be interpreted in an ideal or overly formal sense.

Hereinafter, the present disclosure will be described in detail by describing preferred embodiments thereof with reference to the accompanying drawings. The same reference numerals in each drawing represent the same members.

FIG. 1 shows a circuit diagram of an integrated thermal management system for a vehicle according to an embodiment of the present disclosure.

Referring to FIG. 1, the integrated thermal management system for the vehicle according to the embodiment of the present disclosure includes a refrigerant flow line 100 extending to allow a refrigerant discharged from a compressor 110 to flow in the order of an indoor condenser 120, an external condenser 130, and an evaporator 140 and to flow back to the compressor 110, a refrigerant chiller line 200 branching from the refrigerant flow line 100 at a point downstream of the compressor 110, a point downstream of the indoor condenser 120, or a point downstream of the external condenser 130, the refrigerant chiller line 200 joining the refrigerant flow line 100 at a point upstream of the compressor 110 after the refrigerant, flowing in each of the refrigerant chiller lines 200 branching therefrom, passes through a battery chiller 220 and an electric chiller 230 or bypasses the battery chiller 220 and the electric chiller 230, a battery cooling line 300 extending to allow a coolant, passing through a battery 310 and being discharged therefrom, to circulate while passing through a battery radiator 340 or the battery chiller 220, and an electric cooling line 400 extending to allow a coolant, passing through an electric component 410 and being discharged therefrom, to circulate while passing through an electric radiator 440 or the electric chiller 230.

A liquid refrigerant, a gaseous refrigerant, or a mixture thereof flows in the refrigerant flow line 100, and a state thereof may be changed while flowing therein. The high-temperature/high-pressure refrigerant compressed in the compressor 110 may be condensed or cooled while passing through the indoor condenser 120 and the external condenser 130, and may flow back to the compressor 110 after absorbing heat while evaporating in the evaporator 140.

The indoor condenser 120 and the evaporator 140 may be disposed in an air-conditioning line for indoor air conditioning of a vehicle, and the air-conditioning line may further include a PTC heater 600 that generates heat by additional power supply.

The refrigerant chiller line 200 is configured to branch from the refrigerant flow line 100 and to join the refrigerant flow line 100 again. Further, the refrigerant chiller line 200 allows the refrigerant in the refrigerant flow line 100 to flow thereinto or to be discharged therefrom.

Specifically, the refrigerant chiller line 200 branches from the refrigerant flow line 100 at the point downstream of the compressor 110, the point downstream of the indoor condenser 120, or the point downstream of the external condenser 130, and the refrigerant flows into each of the refrigerant chiller lines 200 branching therefrom. In the embodiment, the refrigerant chiller line 200 may branch from any one of the point downstream of the compressor 110 and the point downstream of the indoor condenser 120, and may branch from the point downstream of the external condenser 130, respectively. In another embodiment, the refrigerant chiller line 200 may branch at the point downstream of the compressor 110 and the point downstream of the indoor condenser 120 respectively and join again, and may branch at the point downstream of the external condenser 130.

In addition, the refrigerant, flowing into the refrigerant chiller line 200, may pass through the battery chiller 220 and the electric chiller 230 or bypass the battery chiller 220 and the electric chiller 230, and may join the refrigerant flow line 100 at the point upstream of the compressor 110 to be discharged therefrom. That is, the refrigerant chiller line 200 may be directly connected to the point upstream of the compressor 110 to join the refrigerant flow line 100. Alternatively, the refrigerant chiller line 200 may be connected to the point upstream of the compressor 110 after sequentially passing through the battery chiller 220 and the electric chiller 230 to join the refrigerant flow line 100.

The battery 310 is provided on the battery cooling line 300, and the battery radiator 340 and the battery chiller 220 are respectively connected in parallel with the battery 310. Accordingly, in the battery cooling line 300, a coolant, passing through the battery 310 and being discharged therefrom, may circulate while passing through the battery radiator 340 or the battery chiller 220.

Particularly, the battery cooling line 300 may include a battery pump 320 configured to circulate the coolant therein.

Further, a battery valve 330 may be provided at a portion of the battery cooling line 300 where the battery radiator 340 and the battery chiller 220 branch or join each other.

The electric component 410 is provided on the electric cooling line 400, and the electric radiator 440 and the electric chiller 230 are respectively connected in parallel with the electric component 410. Accordingly, in the electric cooling line 400, a coolant, passing through the electric component 410 and being discharged therefrom, may circulate while passing through the electric radiator 440 or electric chiller 230.

Particularly, the electric cooling line 400 may include an electric pump 420 configured to circulate the coolant therein. Further, an electric valve 430 may be provided at a portion of the electric cooling line 400 where the electric radiator 440 and the electric chiller 230 branch or join each other.

The battery cooling line 300 and the electric cooling line 400 may further include a reservoir tank 500 connected thereto, and in another embodiment, the reservoir tank 500 may be separately provided on the battery cooling line 300 and the electric cooling line 400.

Here, the battery chiller 220 may be a device capable of performing heat exchange between the coolant flowing into the battery cooling line 300 and the refrigerant flowing into the refrigerant chiller line 200, and the electric chiller 230 may be a device capable of performing heat exchange between the coolant flowing into the electric cooling line 400 and the refrigerant flowing into the refrigerant chiller line 200.

Particularly, the battery chiller 220 and the electric chiller 230 are sequentially provided on the refrigerant chiller line 200, and the refrigerant flowing into the refrigerant chiller line 200 may exchange heat while sequentially passing through the battery chiller 220 and the electric chiller 230. Accordingly, compared to the related art using an integrated chiller, it is possible to have an effect of implementing indoor heating of the vehicle using a heat pump even in a battery 310 heating mode in which the temperature of the coolant in the battery cooling line 300 is raised through the battery chiller 220.

The refrigerant flow line 100 includes a first expansion valve 131 configured to expand the refrigerant and to permit or block flow of the refrigerant at a point upstream of the external condenser 130, and a second expansion valve 141 configured to expand the refrigerant and to permit or block flow of the refrigerant at a point upstream of the evaporator 140. Further, the refrigerant chiller line 200 includes a third expansion valve 221 configured to expand the refrigerant and to permit or block flow of the refrigerant at a point upstream of the battery chiller 220, and a fourth expansion valve 231 configured to expand the refrigerant and to permit or block flow of the refrigerant at a point upstream of the electric chiller 230.

The first expansion valve 131 is provided at the point upstream of the external condenser 130 on the refrigerant flow line 100, thereby making it possible to allow or block the refrigerant flowing to the external condenser 130 and to expand the refrigerant at the point upstream of the external condenser 130 in order to absorb heat from the outside air.

The second expansion valve 141 is provided at the point upstream of the evaporator 140 on the refrigerant flow line 100, thereby making it possible to allow or block the refrigerant flowing to the evaporator 140 and to expand the refrigerant at the point upstream of the evaporator 140 in order to absorb heat from the indoor air.

The third expansion valve 221 is provided at the point upstream of the battery chiller 220 on the refrigerant chiller line 200, thereby making it possible to allow or block the refrigerant flowing to the battery chiller 220 and to expand the refrigerant at the point upstream of the battery chiller 220 in order to absorb heat from the coolant in the battery cooling line 300.

The fourth expansion valve 231 is provided at the point upstream of the electric chiller 230 on the refrigerant chiller line 200, thereby making it possible to allow or block the refrigerant flowing to the electric chiller 230 and to expand the refrigerant at the point upstream of the electric chiller 230 in order to absorb heat from the coolant in the electric cooling line 400.

The refrigerant chiller line 200 includes an integrated valve 210 connected to the point downstream of the compressor 110, the point downstream of the indoor condenser 120, or the point downstream of the external condenser 130 so that the refrigerant in the refrigerant flow line 100 flows thereinto, and connected to the point upstream of the compressor 110 by passing through or bypassing the battery chiller 220 and the electric chiller 230 so that the refrigerant flowing thereinto is discharged to the refrigerant flow line 100. The integrated thermal management system for the vehicle further includes a controller 700 configured to control operation of the compressor 110, to control the integrated valve 210 to regulate the flow of the refrigerant in the refrigerant flow line 100 or the refrigerant chiller line 200, and to control flow of the coolant in the battery cooling line 300 or the electric cooling line 400.

In the embodiment, the integrated valve 210 may be a 4-way valve, may be connected to the refrigerant flow line 100 so that the refrigerant flows thereinto from the point downstream of the compressor 110 or the point downstream of the indoor condenser 120, and may be connected to the refrigerant flow line 100 so that the refrigerant flows thereinto from the point downstream of the external condenser 130. In addition, the integrated valve 210 may be connected to the refrigerant flow line 100 so that the refrigerant, flowing into the refrigerant chiller line 200, is discharged to the point upstream of the compressor 110 through the battery chiller 220 and the electric chiller 230, or may be connected to the refrigerant flow line 100 so that the refrigerant flowing thereinto is discharged to the point upstream of the compressor 110 by bypassing the battery chiller 220 and the electric chiller 230.

In another embodiment, the integrated valve 210 may be formed of a plurality of 3-way valves or 2-way valves.

The controller 700 may control the operation of the compressor 110, may control the integrated valve 210 to regulate the flow of the refrigerant in the refrigerant flow line 100 or the refrigerant chiller line 200, may control driving of the battery pump 320, the electric pump 420, and a coolant heater 350, and may control the battery valve 330 and the electric valve 430 to regulate the flow of the coolant in the battery cooling line 300 and the electric cooling line 400.

Further, the controller 700 controls the first expansion valve 131, the second expansion valve 141, the third expansion valve 221, and the fourth expansion valve 231, thereby controlling the flow, blocking, or expansion of the refrigerant in the refrigerant flow line 100 or the refrigerant chiller line 200.

FIGS. 2 to 11 show various control modes of the integrated thermal management system for the vehicle according to the embodiment of the present disclosure.

Referring further to FIGS. 2 to 11, in the integrated thermal management system for the vehicle according to the embodiment of the present disclosure, the refrigerant chiller line 200 branches from the refrigerant flow line 100 at the point downstream of the indoor condenser 120 and the point downstream of the external condenser 130, respectively, and the refrigerant, flowing in each of the refrigerant chiller lines 200 branching therefrom, passes through or bypasses the battery chiller 220 and the electric chiller 230 to join the point upstream of the compressor 110. Accordingly, the indoor condenser 120 may be connected in series with the battery chiller 220 and the electric chiller 230.

That is, in the integrated thermal management system for the vehicle according to the embodiment of the present disclosure, the indoor condenser 120 on the refrigerant flow line 100 is connected in series with the refrigerant chiller line 200. Accordingly, the refrigerant in the refrigerant flow line 100, passing through the indoor condenser 120, may flow into the battery chiller 220 and the electric chiller 230 through the refrigerant chiller line 200. Further, the high-temperature/high-pressure refrigerant discharged from the compressor 110 flows to the battery chiller 220 connected in series with the indoor condenser 120, thereby supplying heat to raise the temperature of the battery 310.

Referring further to FIGS. 2 to 5, the integrated thermal management system for the vehicle according to the embodiment of the present disclosure may perform control operation with an electric cooling mode in which the electric component 410 is cooled, a battery 310 cooling mode, and an indoor cooling mode.

Figure 2:
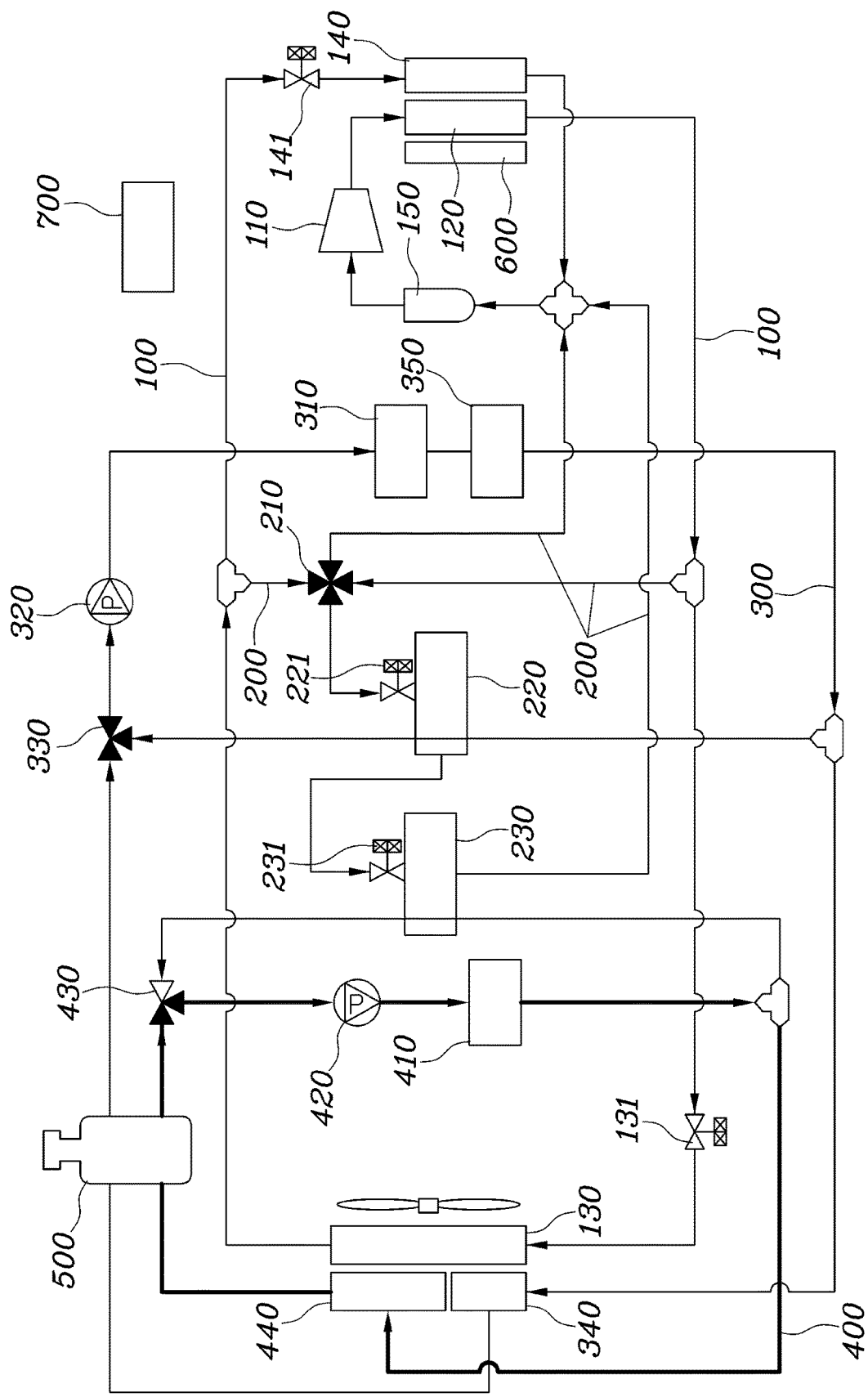
FIG. 2 shows a control mode of the integrated thermal management system for the vehicle of FIG. 1 according to an embodiment of the present disclosure.

More specifically, as shown in FIG. 2, in the electric cooling mode, the controller 700 may perform the control operation to drive the electric pump 420 so that the coolant in the electric cooling line 400 circulates, and may control the electric valve 430 so that the coolant, passing through the electric component 410, flows to the electric radiator 440. The electric valve 430 may be a 3-way valve.

Figure 3:
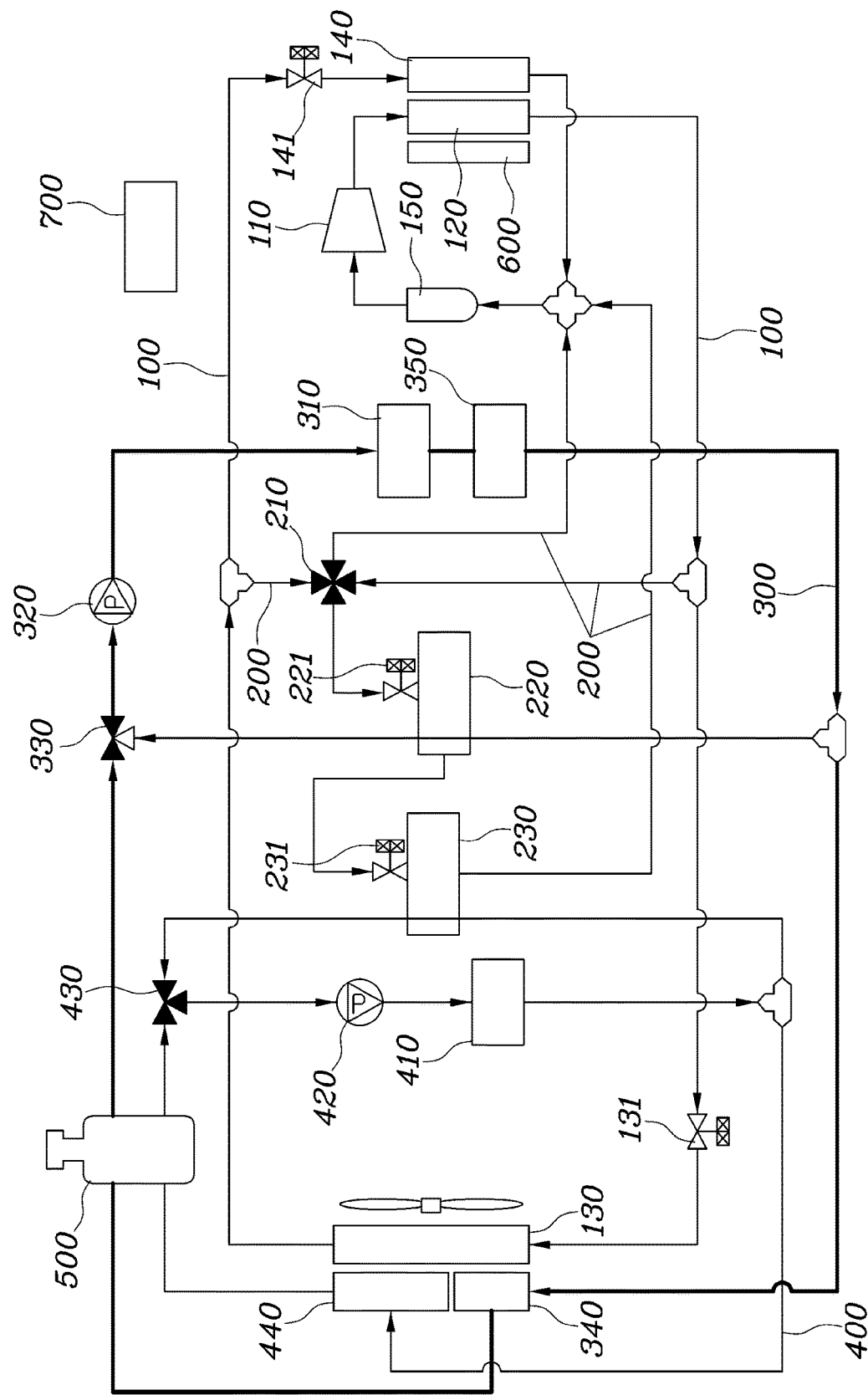
FIG. 3 shows another control mode of the integrated thermal management system for the vehicle of FIG. 1 according to an embodiment of the present disclosure.
Figure 4:
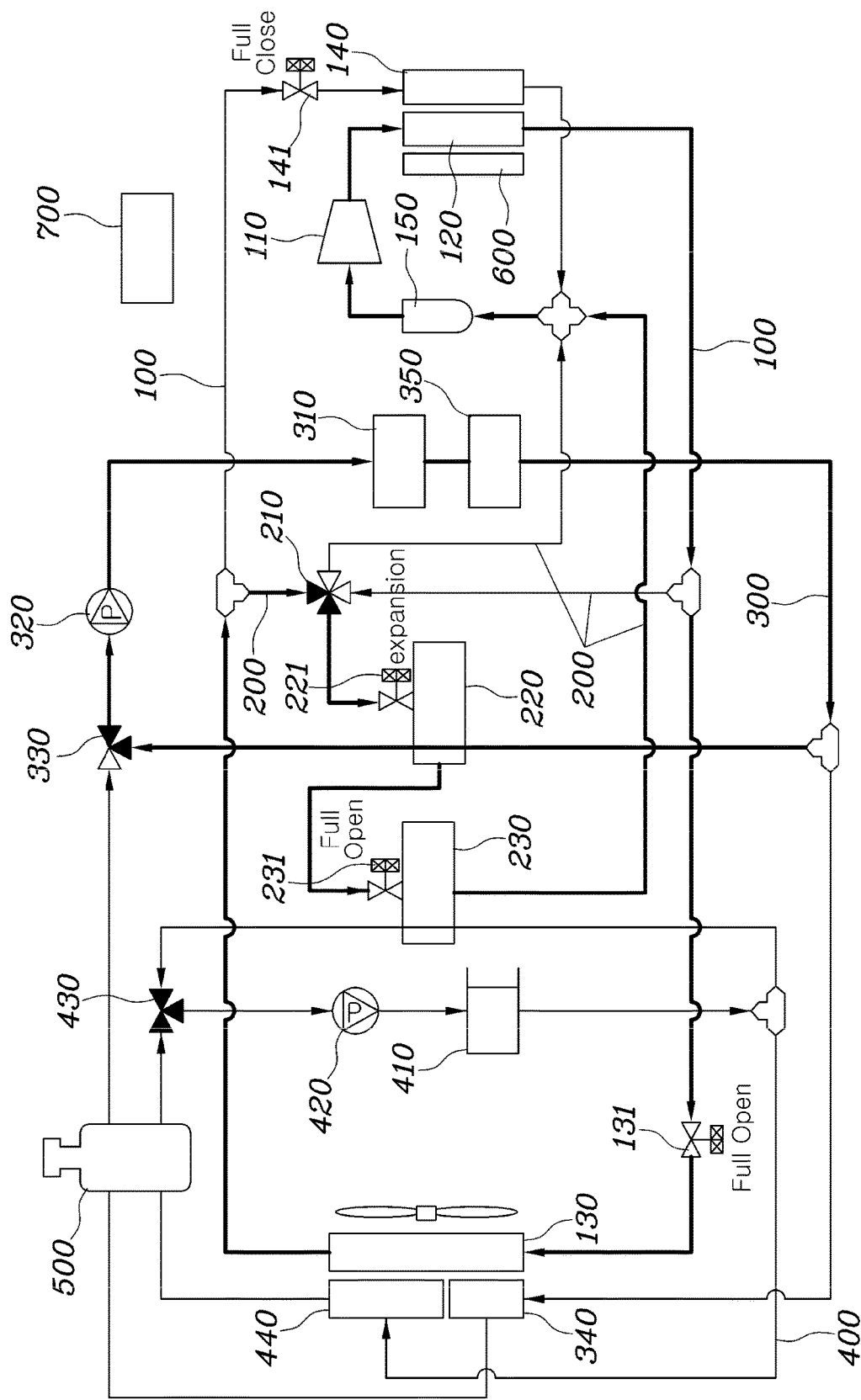
FIG. 4 shows another control mode of the integrated thermal management system for the vehicle of FIG. 1 according to an embodiment of the present disclosure.

Additionally, as shown in FIGS. 3 and 4, the controller 700 performs the control operation with a battery 310-radiator cooling mode in which the battery 310 is cooled with the battery radiator 340 or with a battery 310-chiller cooling mode in which the battery 310 is cooled with the battery chiller 220.

Particularly, as shown in FIG. 3, in the battery 310-radiator cooling mode, the controller 700 may perform the control operation to drive the battery pump 320 so that the coolant in the battery cooling line 300 circulates, and may control the battery valve 330 so that the coolant, passing through the battery 310, flows to the battery radiator 340. The battery valve 330 may be a 3-way valve.

As shown in FIG. 4, in the battery 310-chiller cooling mode, the controller 700 may perform the control operation to drive the battery pump 320 so that the coolant in the battery cooling line 300 circulates, and may control the battery valve 330 so that the coolant, passing through the battery 310, flows to the battery chiller 220.

Further, the controller 700 may drive the compressor 110 in the refrigerant flow line 100 so that the refrigerant, flowing into the refrigerant chiller line 200, absorbs heat in the battery chiller 220, and may control the integrated valve 210 so that the refrigerant flows from the refrigerant flow line 100 to the refrigerant chiller line 200 at the point downstream of the external condenser 130 and the refrigerant, flowing to the refrigerant chiller line 200, flows to the battery chiller 220 and the electric chiller 230.

In addition, the controller 700 may fully open the first expansion valve 131, may fully close the second expansion valve 141, may open the third expansion valve 221 to expand the refrigerant, and may fully open the fourth expansion valve 231.

Figure 5:
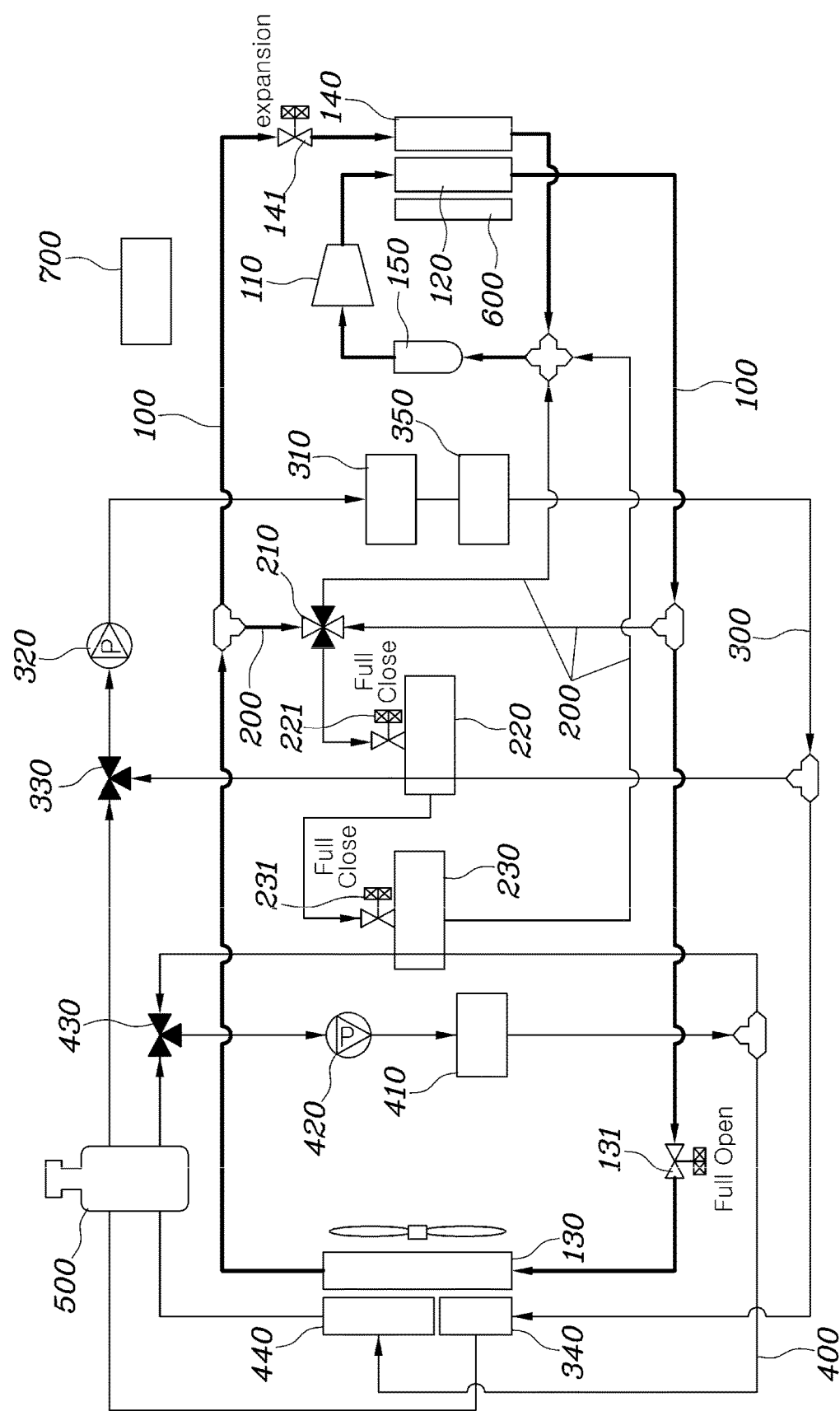
FIG. 5 shows another control mode of the integrated thermal management system for the vehicle of FIG. 1 according to an embodiment of the present disclosure.

As shown in FIG. 5, in the indoor cooling mode, the controller 700 may fully open the first expansion valve 131 and may open the second expansion valve 141 to expand the refrigerant while driving the compressor 110 so as to allow the refrigerant to flow to the refrigerant flow line 100. Further, the controller 700 may control the integrated valve 210 to block flow of the refrigerant from the refrigerant flow line 100 to the refrigerant chiller line 200.

Particularly, the controller 700 may independently control the integrated thermal management system for the vehicle according to the embodiment of the present disclosure in the electric cooling mode, the battery 310 cooling mode, and the indoor cooling mode, and may also control the same in a control mode in which the above-mentioned modes are combined with each other.

Figure 6:
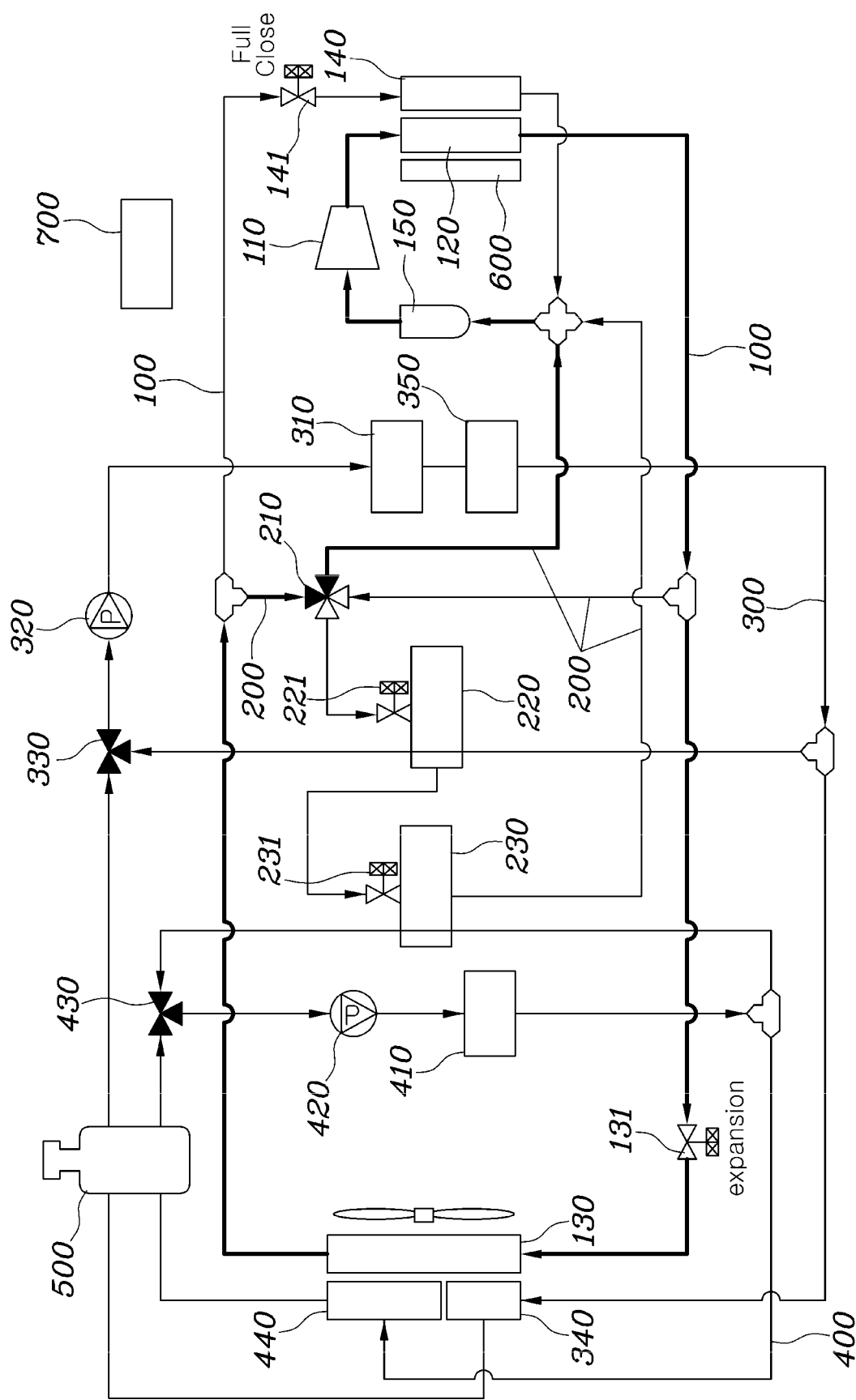
FIG. 6 shows another control mode of the integrated thermal management system for the vehicle of FIG. 1 according to an embodiment of the present disclosure.
Figure 7:
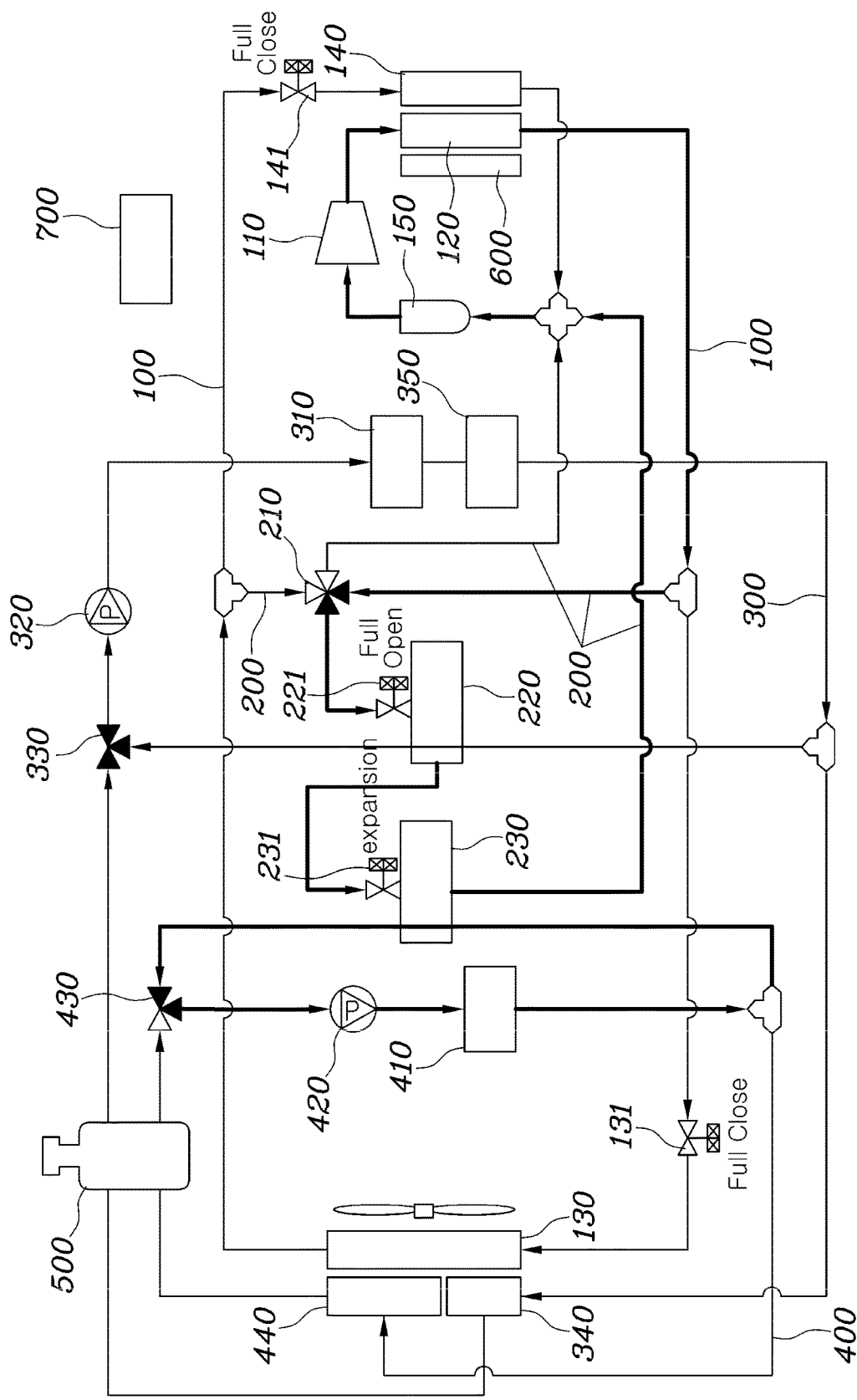
FIG. 7 shows another control mode of the integrated thermal management system for the vehicle of FIG. 1 according to an embodiment of the present disclosure.
Figure 8:
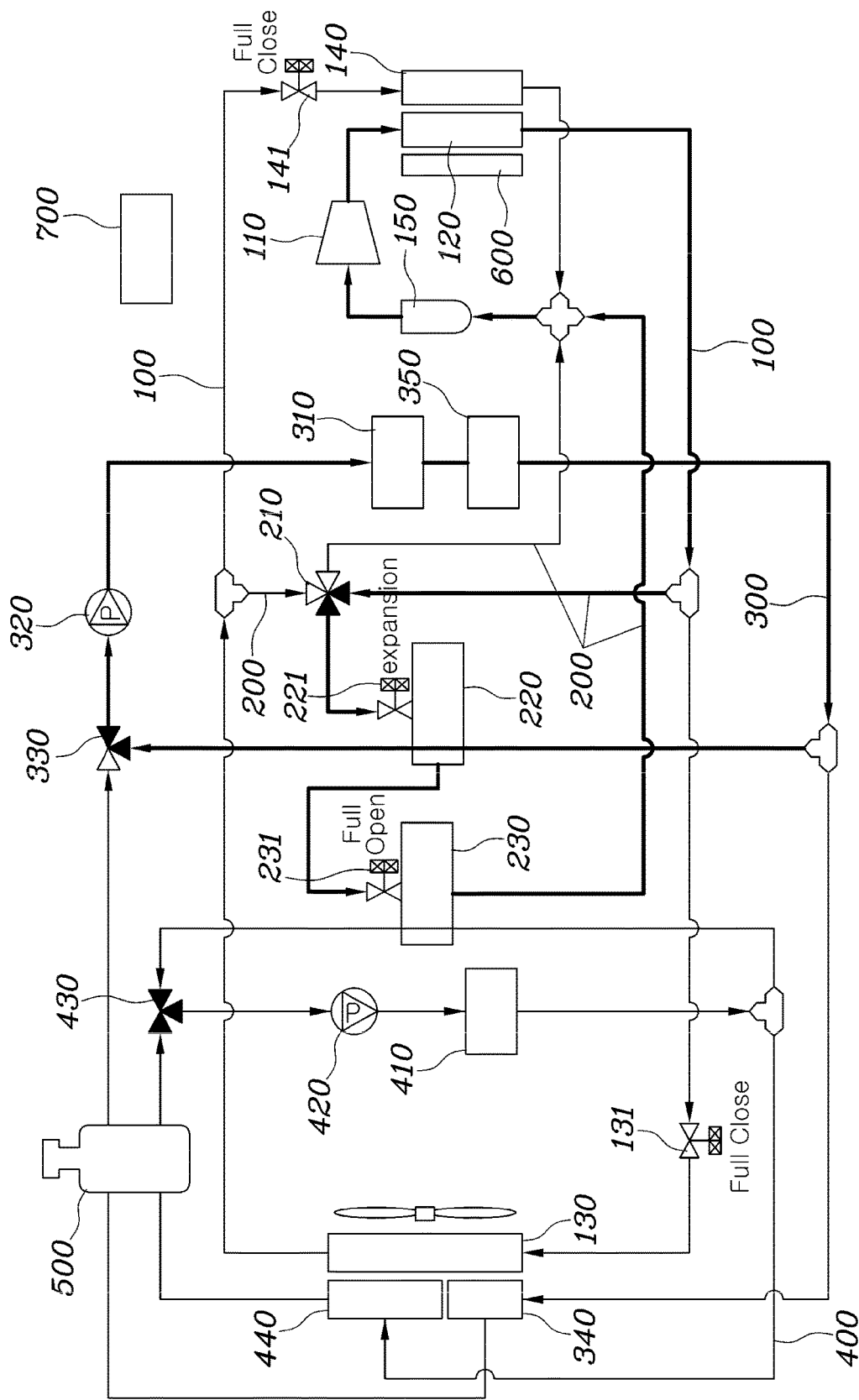
FIG. 8 shows another control mode of the integrated thermal management system for the vehicle of FIG. 1 according to an embodiment of the present disclosure.

FIGS. 6 to 8 show an indoor heating mode of the integrated thermal management system for the vehicle according to the embodiment of the present disclosure.

Referring further to FIGS. 6 to 8, the integrated thermal management system for the vehicle according to the embodiment of the present disclosure may heat the passenger compartment by radiating heat absorbed from outside air, electric waste heat, or the battery 310 using a heat pump cycle in the indoor condenser 120.

Particularly, as shown in FIG. 6, in an outdoor air heat absorption heating mode, the controller 700 may control the integrated valve 210 so that the refrigerant in the refrigerant flow line 100 flows into the refrigerant chiller line 200 at the point downstream of the external condenser 130 and bypasses the battery chiller 220 and the electric chiller 230 through the refrigerant chiller line 200 to be discharged to the refrigerant flow line 100 at the point upstream of the compressor 110, and may expand the refrigerant at the point upstream of the external condenser 130 on the refrigerant chiller line 200 to absorb heat from the outside air.

That is, the controller 700 may heat the passenger compartment while causing the refrigerant compressed at high temperature/high pressure to flow to the indoor condenser 120 in the outdoor air heat absorption heating mode, and may absorb heat from the outside air by expanding the refrigerant in the first expansion valve 131 located at the point upstream of the external condenser 130. In addition, the controller 700 may control the integrated valve 210 so that the refrigerant in the refrigerant flow line 100 at the point downstream of the external condenser 130 flows into the refrigerant chiller line 200 and bypasses the battery chiller 220 and the electric chiller 230 to flow to the point upstream of the compressor 110.

Further, as shown in FIG. 7, in an electric waste heat absorption heating mode, the controller 700 may permit flow of the coolant so that the coolant, passing through the electric component 410 and being discharged therefrom in the electric cooling line 400, circulates while passing through the electric chiller 230, may control the integrated valve 210 so that the refrigerant in the refrigerant flow line 100 flows into the refrigerant chiller line 200 at the point downstream of the indoor condenser 120 or at the point downstream of the external condenser 130 and is discharged to the refrigerant flow line 100 at the point upstream of the compressor 110 via the battery chiller 220 and the electric chiller 230 through the refrigerant chiller line 200, and may absorb waste heat of the electric component 410 by expanding the refrigerant at the point upstream of the electric chiller 230 on the refrigerant chiller line 200.

That is, in the electric waste heat absorption heating mode, the controller 700 may heat the passenger compartment while causing the refrigerant compressed at high temperature/high pressure to flow to the indoor condenser 120, and may absorb the waste heat absorbed by the electric component 410 by expanding the refrigerant in the fourth expansion valve 231 located at the point upstream of the electric chiller 230. Further, the controller 700 may control the integrated valve 210 so that the refrigerant in the refrigerant flow line 100 at the point downstream of the indoor condenser 120 flows into the refrigerant chiller line 200, and the refrigerant in the refrigerant chiller line 200 flows back to the compressor 110 on the refrigerant flow line 100 via the battery chiller 220 and the electric chiller 230. However, according to another embodiment (a parallel connection structure in FIG. 13), the refrigerant in the refrigerant flow line 100 may flow into the refrigerant chiller line 200 through the point downstream of the external condenser 130.

Further, the controller 700 may drive the electric pump 420 so that the coolant in the electric cooling line 400 absorbs the waste heat of the electric component 410, and may control the electric valve 430 so that the coolant, passing through the electric component 410, flows to the electric chiller 230.

As shown in FIG. 8, in the battery 310 waste heat absorption heating mode, the controller 700 may permit flow of the coolant so that the coolant, passing through the battery 310 and being discharged therefrom in the battery cooling line 300, circulates while passing through the battery chiller 220, may control the integrated valve 210 so that the refrigerant in the refrigerant flow line 100 flows into the refrigerant chiller line 200 through the point downstream of the indoor condenser 120 or the point downstream of the external condenser 130 and is discharged to the refrigerant flow line 100 at the point upstream of the compressor 110 via the battery chiller 220 and the electric chiller 230 through the refrigerant chiller line 200, and may absorb waste heat of the battery 310 by expanding the refrigerant at the point upstream of the battery chiller 220 on the refrigerant chiller line 200.

That is, in the battery 310 waste heat absorption heating mode, as shown in the drawing, the controller 700 may control the integrated valve 210 so that the refrigerant in the refrigerant flow line 100 flows into the refrigerant chiller line 200 through the point downstream of the indoor condenser 120 and is discharged to the refrigerant flow line 100 at the point upstream of the compressor 110 via the battery chiller 220 and the electric chiller 230 through the refrigerant chiller line 200. However, according to another embodiment (a parallel connection structure in FIG. 14), the refrigerant in the refrigerant flow line 100 may flow into the refrigerant chiller line 200 through the point downstream of the external condenser 130. In addition, the controller 700 may control the third expansion valve 221 to expand the refrigerant at the point upstream of the battery chiller 220 on the refrigerant chiller line 200.

In addition, the controller 700 may drive the battery pump 320 so that the coolant in the battery cooling line 300 absorbs the waste heat of the battery 310, and may control the battery valve 330 so that the coolant, passing through the battery 310, flows to the battery chiller 220.

Figure 9:
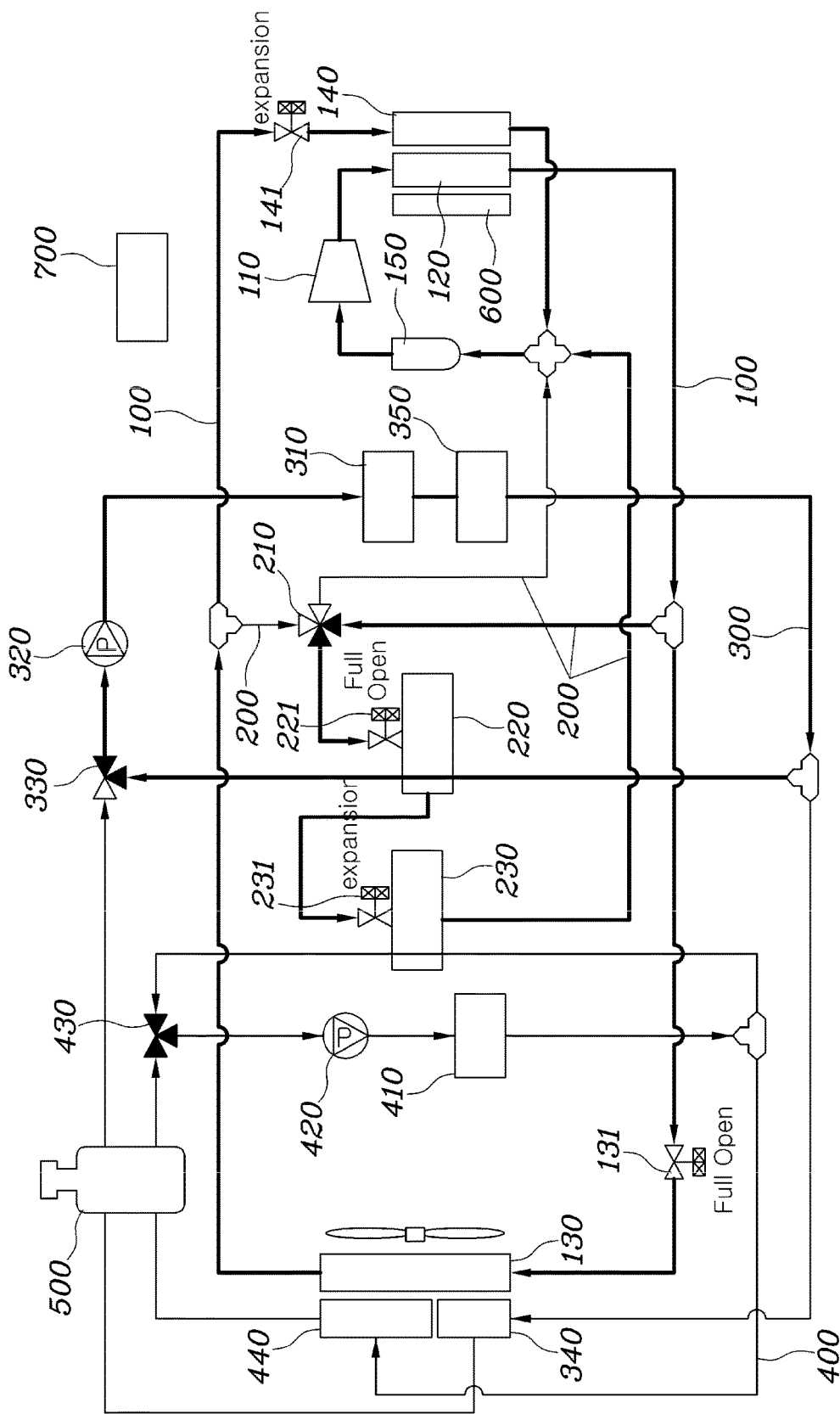
FIG. 9 shows another control mode of the integrated thermal management system for the vehicle of FIG. 1 according to an embodiment of the present disclosure.
Figure 10:
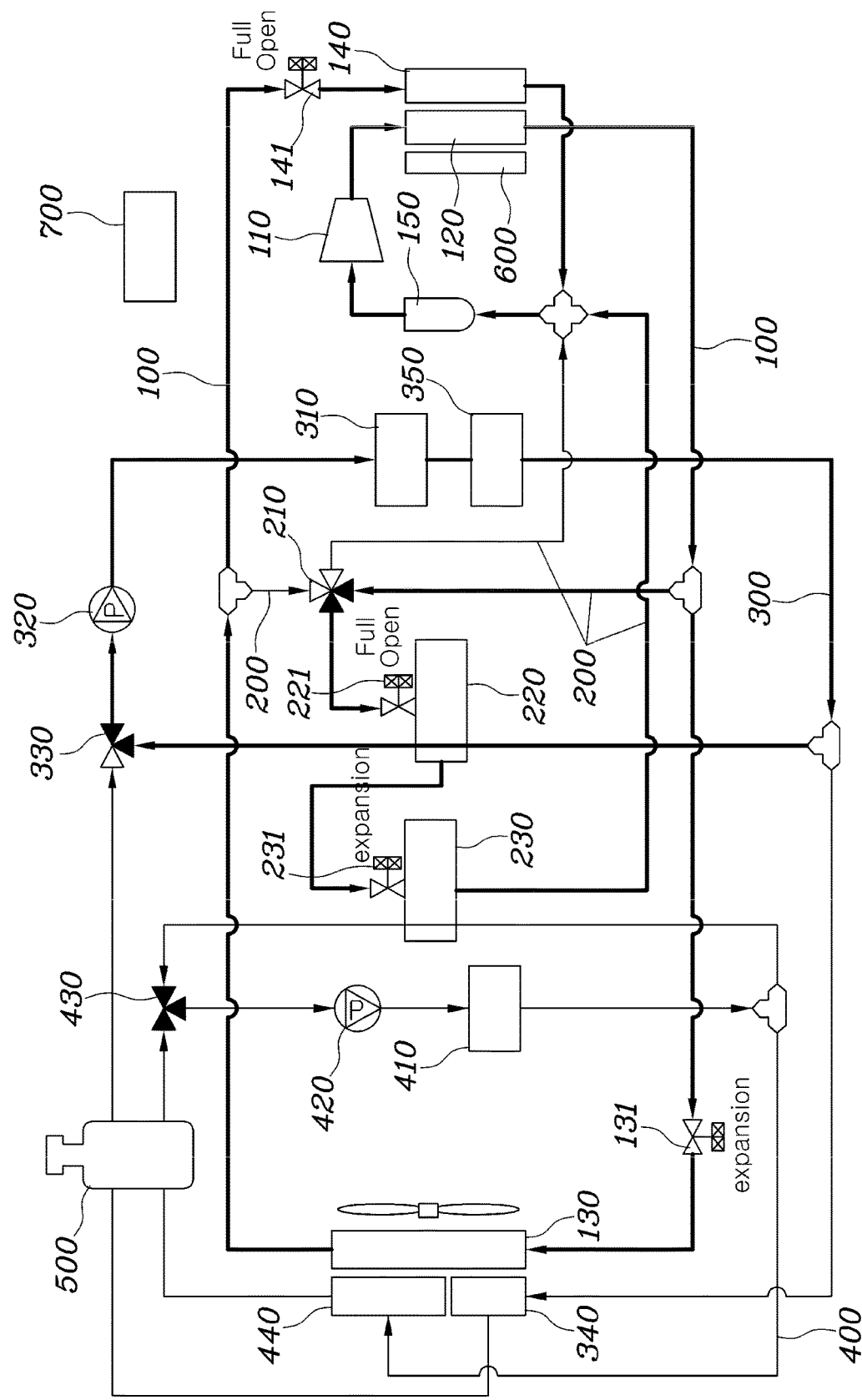
FIG. 10 shows another control mode of the integrated thermal management system for the vehicle of FIG. 1 according to an embodiment of the present disclosure.
Figure 11:
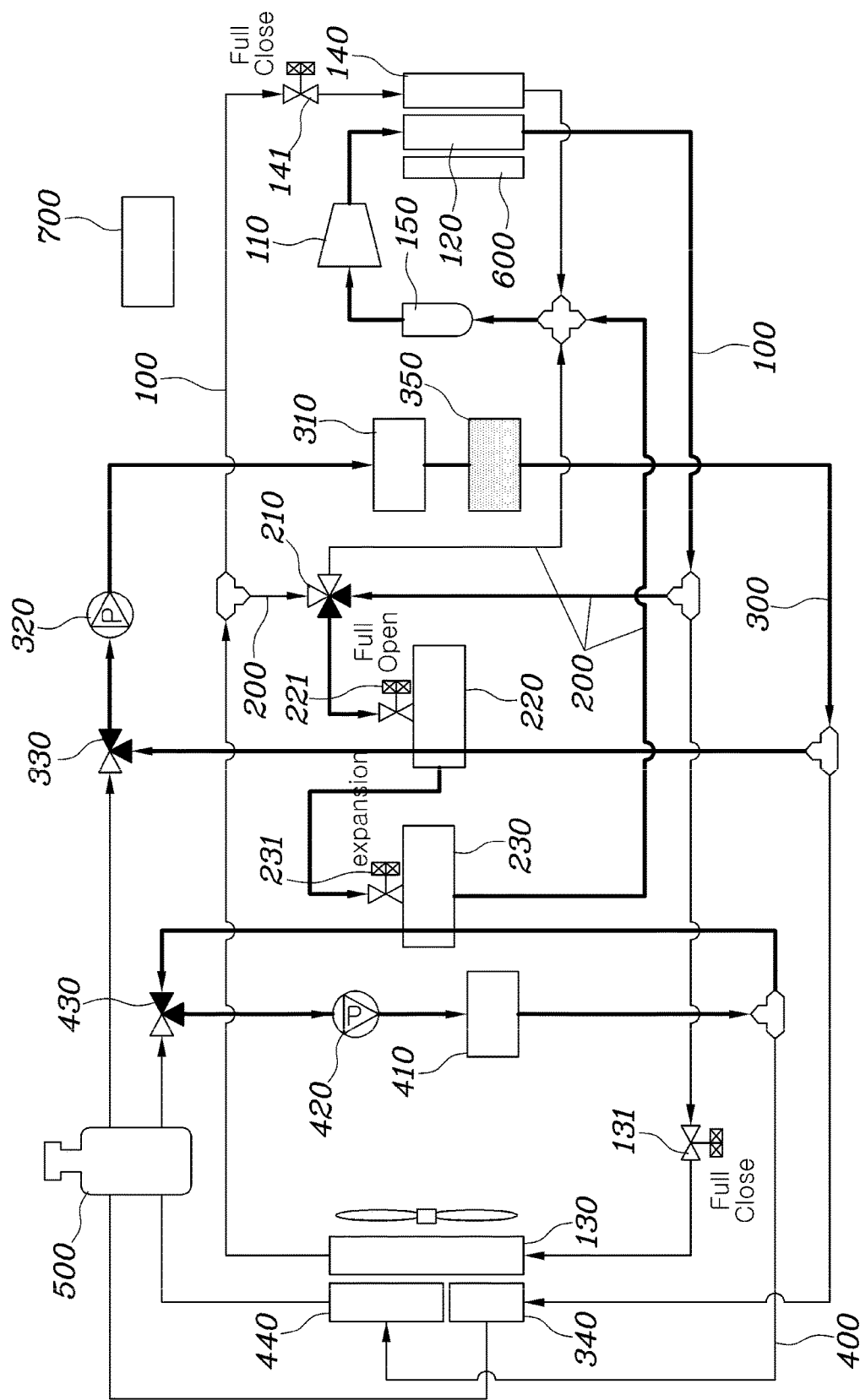
FIG. 11 shows another control mode of the integrated thermal management system for the vehicle of FIG. 1 according to an embodiment of the present disclosure.

FIGS. 9 to 11 show a battery 310 heating mode of the integrated thermal management system for the vehicle according to the embodiment of the present disclosure.

Referring further to FIGS. 9 to 11, in the battery 310 heating mode, the controller 700 may permit flow of the coolant so that the coolant, passing through battery 310 and being discharged therefrom in the battery cooling line 300, circulates while passing through the battery chiller 220, and may control the integrated valve 210 so that the refrigerant in the refrigerant flow line 100 flows into the refrigerant chiller line 200 at the point downstream of the indoor condenser 120 or at the point downstream of the compressor 110 and is discharged to the refrigerant flow line 100 at the point upstream of the compressor 110 via the battery chiller 220 and the electric chiller 230 through the refrigerant chiller line 200.

That is, in the battery 310 heating mode, the controller 700 may control the integrated valve 210 so that the high temperature/high pressure refrigerant discharged from the compressor 110 flows into the refrigerant chiller line 200 at the point downstream of the indoor condenser 120 or at the point downstream of the compressor 110, and the refrigerant, flowing into the refrigerant chiller line 200, is discharged to the refrigerant flow line 100 at the point upstream of the compressor 110 via the battery chiller 220 and the electric chiller 230.

Additionally, the controller 700 may drive the battery pump 320 so that the coolant in the battery cooling line 300 absorbs heat from the battery chiller 220, and may control the battery valve 330 so that the coolant, passing through the battery 310, flows to the battery chiller 220. Further, the controller 700 may operate the coolant heater 350 provided on the battery cooling line 300.

Particularly, as shown in the drawing, the indoor condenser 120 may be connected in series with the refrigerant chiller line 200, and, as such, the refrigerant in the refrigerant flow line 100 may flow into the refrigerant chiller line 200 at the point downstream of the indoor condenser 120.

As shown in FIG. 9, the second expansion valve 141 located at the point upstream of the evaporator 140 may expand the refrigerant to absorb the heat from the indoor air, as shown in FIG. 10, the first expansion valve 131 located at the point upstream of the external condenser 130 may expand the refrigerant to absorb the heat from the outside air, or as shown in FIG. 11, the fourth expansion valve 231 located at the point upstream of the electric chiller 230 may expand the refrigerant to absorb the waste heat of the electric component 410.

In addition, the controller 700 may implement an indoor dehumidification mode by simultaneously performing control operation for indoor heating and indoor cooling (indoor air heat absorption).

Figure 12:
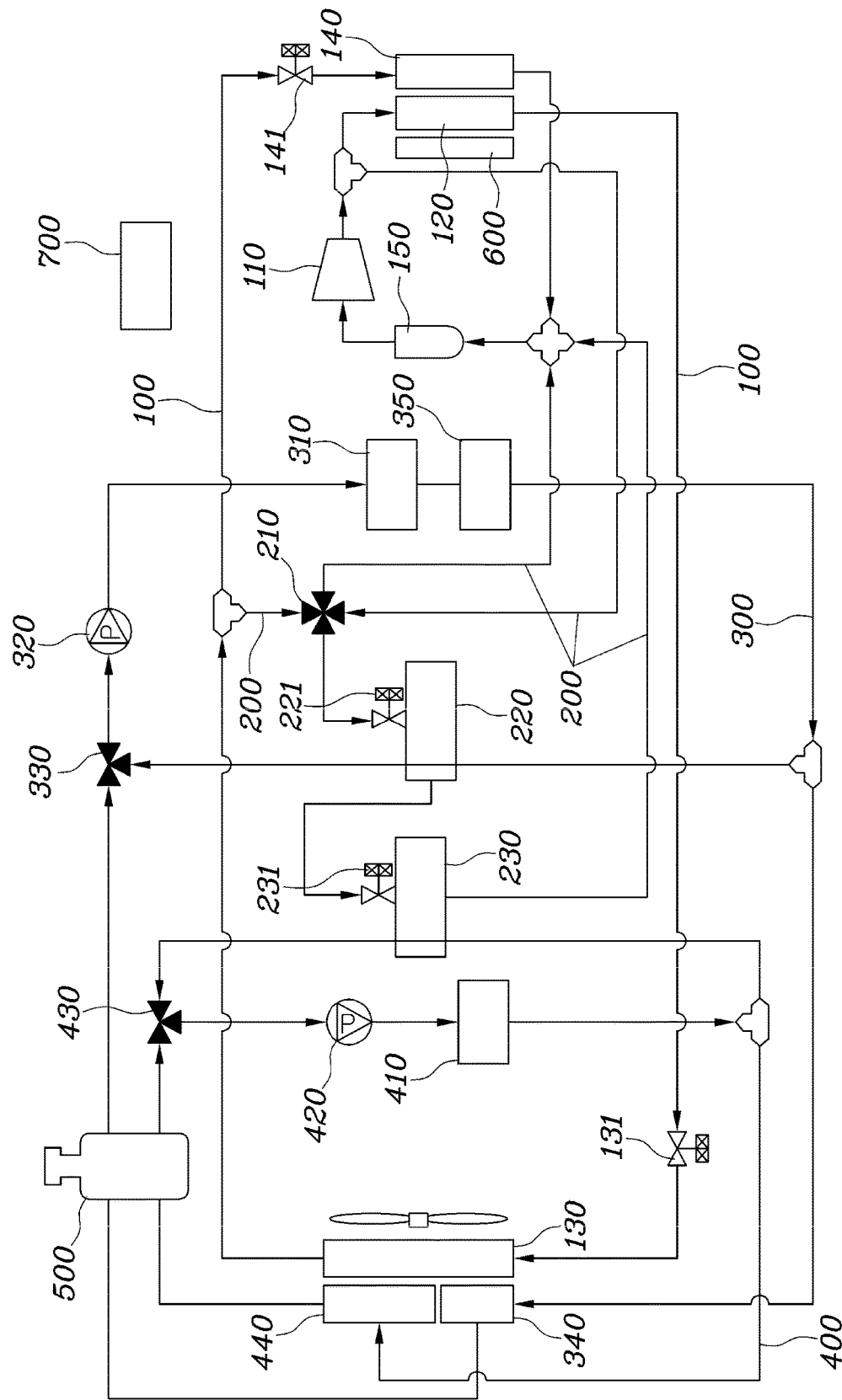
FIG. 12 shows another circuit diagram of an integrated thermal management system for a vehicle according to an embodiment of the present disclosure.

FIG. 12 shows a circuit diagram of an integrated thermal management system for a vehicle according to another embodiment of the present disclosure.

Referring to FIG. 12, the refrigerant chiller line 200 of the integrated thermal management system for the vehicle according to another embodiment of the present disclosure branches from the refrigerant flow line 100 at the point downstream of the compressor 110 and the point downstream of the external condenser 130, respectively, and the refrigerant, flowing in each of the refrigerant chiller lines 200 branching therefrom, passes through or bypasses the battery chiller 220 and the electric chiller 230 to join the point upstream of the compressor 110. Accordingly, the indoor condenser 120 may be connected in parallel with the battery chiller 220 and the electric chiller 230.

That is, the integrated thermal management system for the vehicle according to another embodiment of the present disclosure has a parallel structure in which the indoor condenser 120 and the refrigerant chiller line 200 are connected in parallel with each other, and, as such, the refrigerant in the refrigerant flow line 100 bypasses the indoor condenser 120 and flows to the battery chiller 220 and the electric chiller 230 on the refrigerant chiller line 200.

Accordingly, it is possible to solve a problem of a serial structure system in which it is difficult to supply sufficient heat to the battery chiller 220 because the high-temperature/high-pressure refrigerant discharged from the compressor 110 flows to the battery chiller 220 through the indoor condenser 120.

The refrigerant chiller line 200 includes the integrated valve 210 connected to the point downstream of the compressor 110 and the point downstream of the external condenser 130 so that the refrigerant in the refrigerant flow line 100 flows thereinto, and connected to the point upstream of the compressor 110 by passing through or bypassing the battery chiller 220 and the electric chiller 230 so that the refrigerant flowing thereinto is discharged to the refrigerant flow line 100. The integrated thermal management system for the vehicle may further include the controller 700 configured to control the operation of the compressor 110, to control the integrated valve 210 to regulate the flow of the refrigerant in the refrigerant flow line 100 or the refrigerant chiller line 200, and to control the flow of the coolant in the battery cooling line 300 or the electric cooling line 400.

That is, the integrated valve 210 may selectively receive the refrigerant in the refrigerant flow line 100 branching at the point downstream of the compressor 110 and the refrigerant in the refrigerant flow line 100 branching at the point downstream of the external condenser 130, and may selectively discharge the refrigerant flowing into the refrigerant chiller line 200 to the battery chiller 220 and the electric chiller 230, and the point upstream of the compressor 110.

Figure 13:
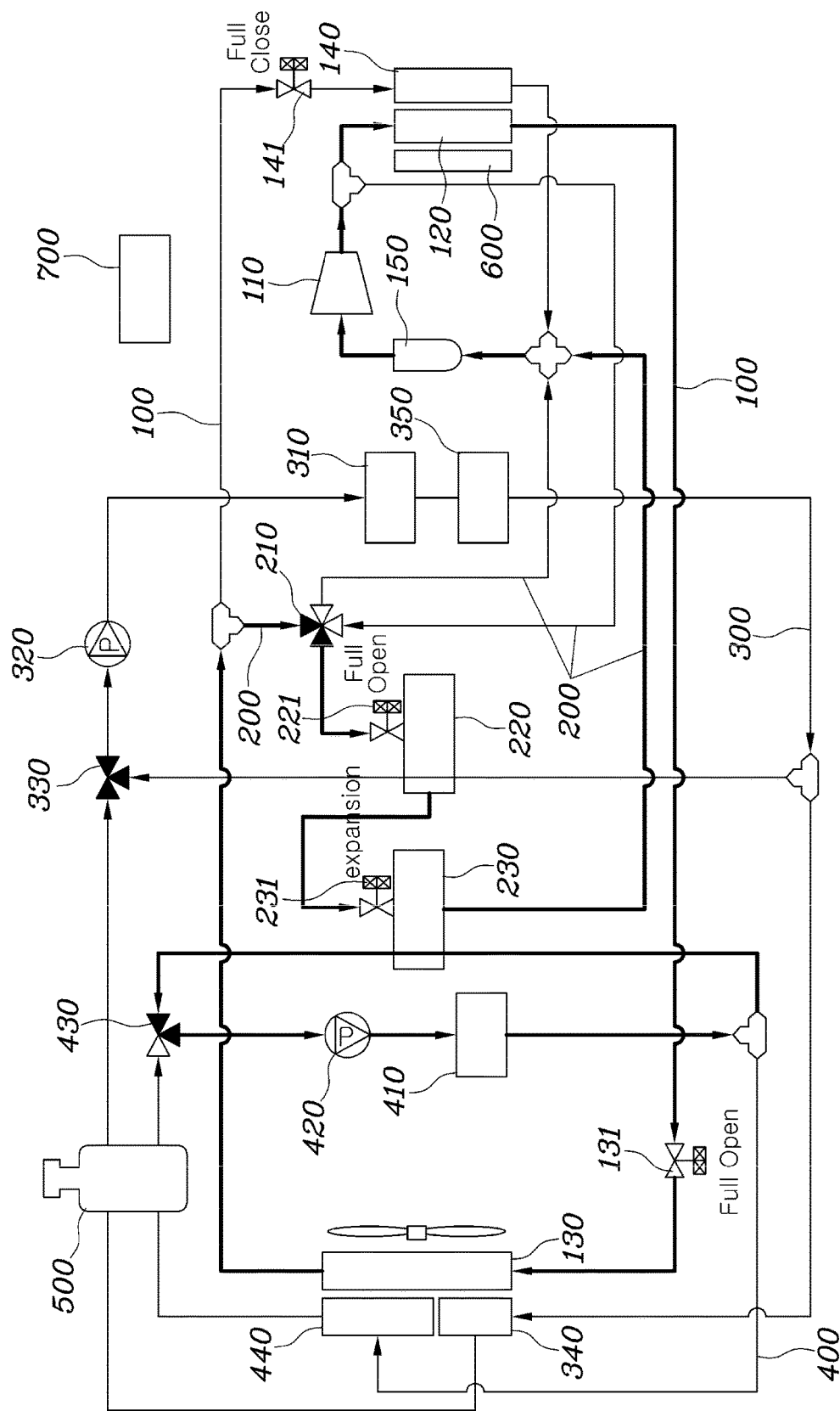
FIG. 13 shows an indoor heating mode of the integrated thermal management system for the vehicle of FIG. 12 according to an embodiment of the present disclosure.
Figure 14:
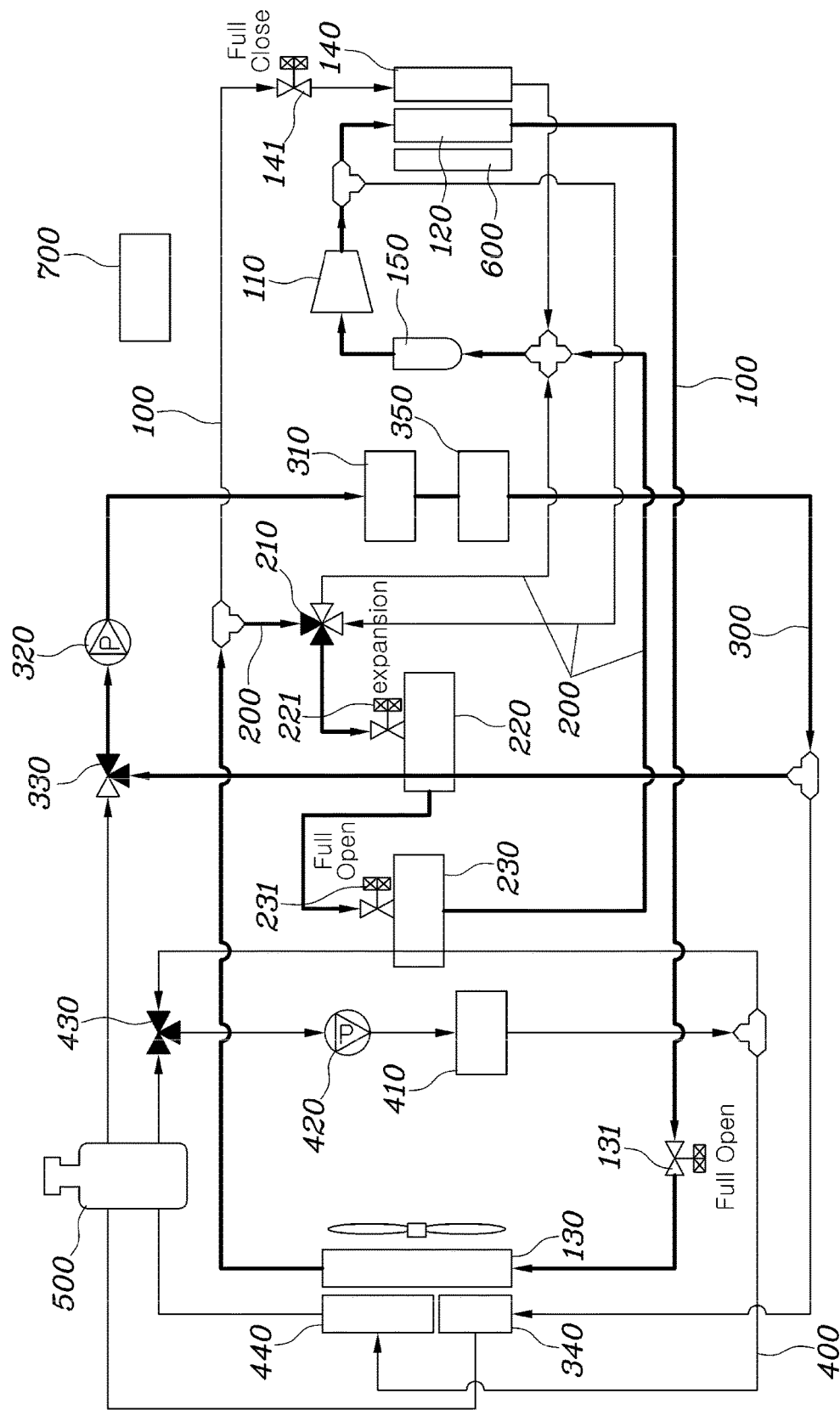
FIG. 14 shows another indoor heating mode of the integrated thermal management system for the vehicle of FIG. 12 according to an embodiment of the present disclosure.

FIGS. 13 and 14 show an indoor heating mode of the integrated thermal management system for the vehicle according to another embodiment of the present disclosure.

Referring further to FIGS. 13 and 14, the integrated thermal management system for the vehicle according to another embodiment of the present disclosure may heat the passenger compartment by absorbing the heat from the outside air, absorbing the waste heat of the electric component 410, or absorbing the waste heat of the battery 310. The outdoor air heat absorption heating mode is the same as that of the integrated thermal management system for the vehicle according to the embodiment of the present disclosure shown in FIG. 6.

As shown in FIG. 13, in the electric waste heat absorption heating mode, the controller 700 may permit flow of the coolant so that the coolant, passing through the electric component 410 and being discharged therefrom in the electric cooling line 400, circulates while passing through the electric chiller 230, may control the integrated valve 210 so that the refrigerant in the refrigerant flow line 100 flows into the refrigerant chiller line 200 at the point downstream of the external condenser 130 and is discharged to the refrigerant flow line 100 at the point upstream of the compressor 110 via the battery chiller 220 and the electric chiller 230 through the refrigerant chiller line 200, and may absorb the waste heat of the electric component 410 by expanding the refrigerant at the point upstream of the electric chiller 230 on the refrigerant chiller line 200.

In addition, as shown in FIG. 14, in the battery 310 waste heat absorption heating mode, the controller 700 may permit flow of the coolant so that the coolant, passing through the battery 310 and being discharged therefrom in the battery cooling line 300, circulates while passing through the battery chiller 220, may control the integrated valve 210 so that the refrigerant in the refrigerant flow line 100 flows into the refrigerant chiller line 200 at the point downstream of the external condenser 130 and is discharged to the refrigerant flow line 100 at the point upstream of the compressor 110 via the battery chiller 220 and the electric chiller 230 through the refrigerant chiller line 200, and may absorb the waste heat of the battery 310 by expanding the refrigerant at the point upstream of the battery chiller 220 on the refrigerant chiller line 200.

In the integrated thermal management system for the vehicle according to another embodiment of the present disclosure, since the refrigerant in the refrigerant flow line 100, passing through the indoor condenser 120, flows to the external condenser 130 without branching, the refrigerant therein may branch after passing through the external condenser 130 and may flow into the refrigerant chiller line 200.

Figure 15:
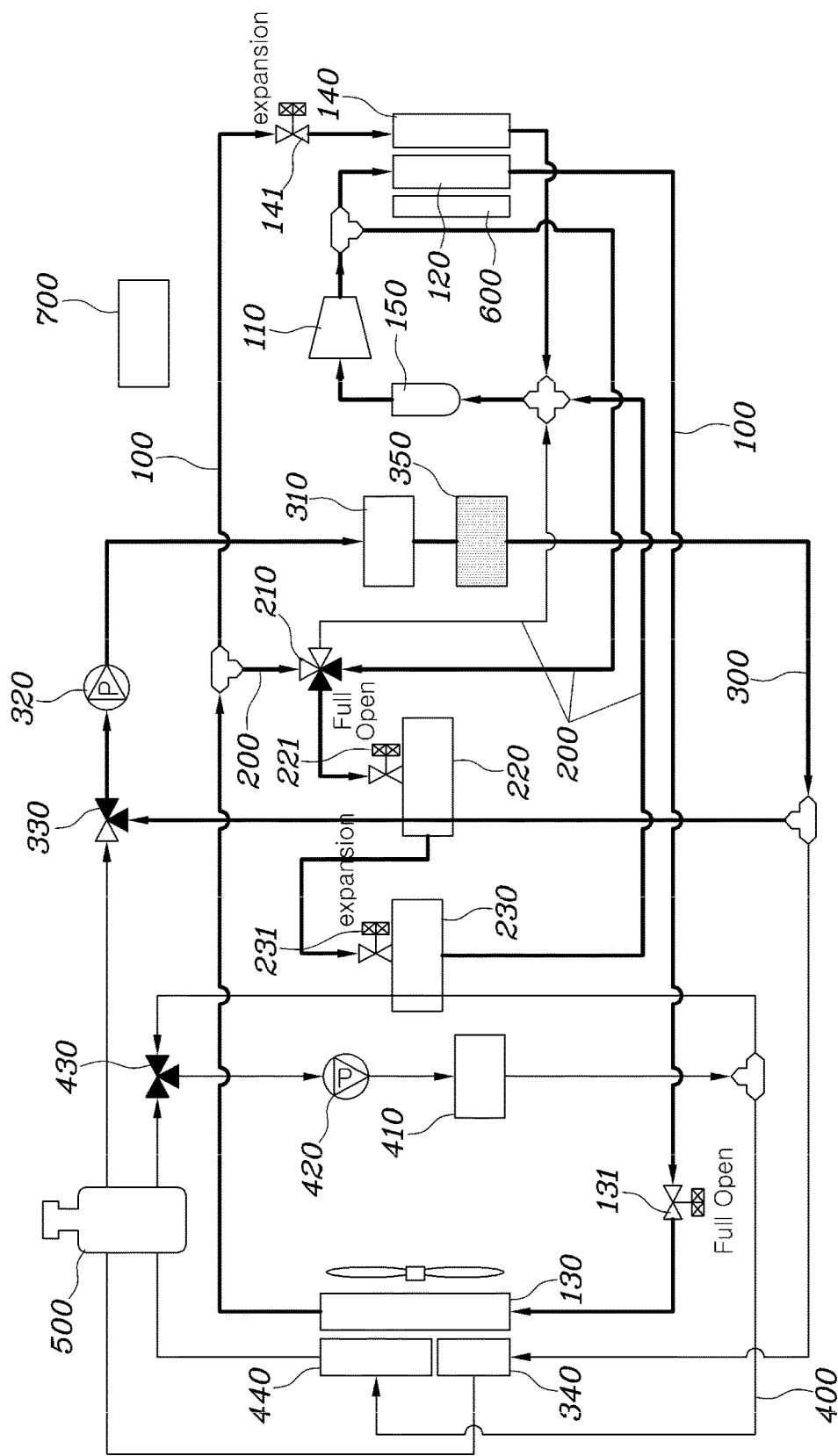
FIG. 15 shows a battery heating mode of the integrated thermal management system for the vehicle of FIG. 12 according to an embodiment of the present disclosure.
Figure 16:
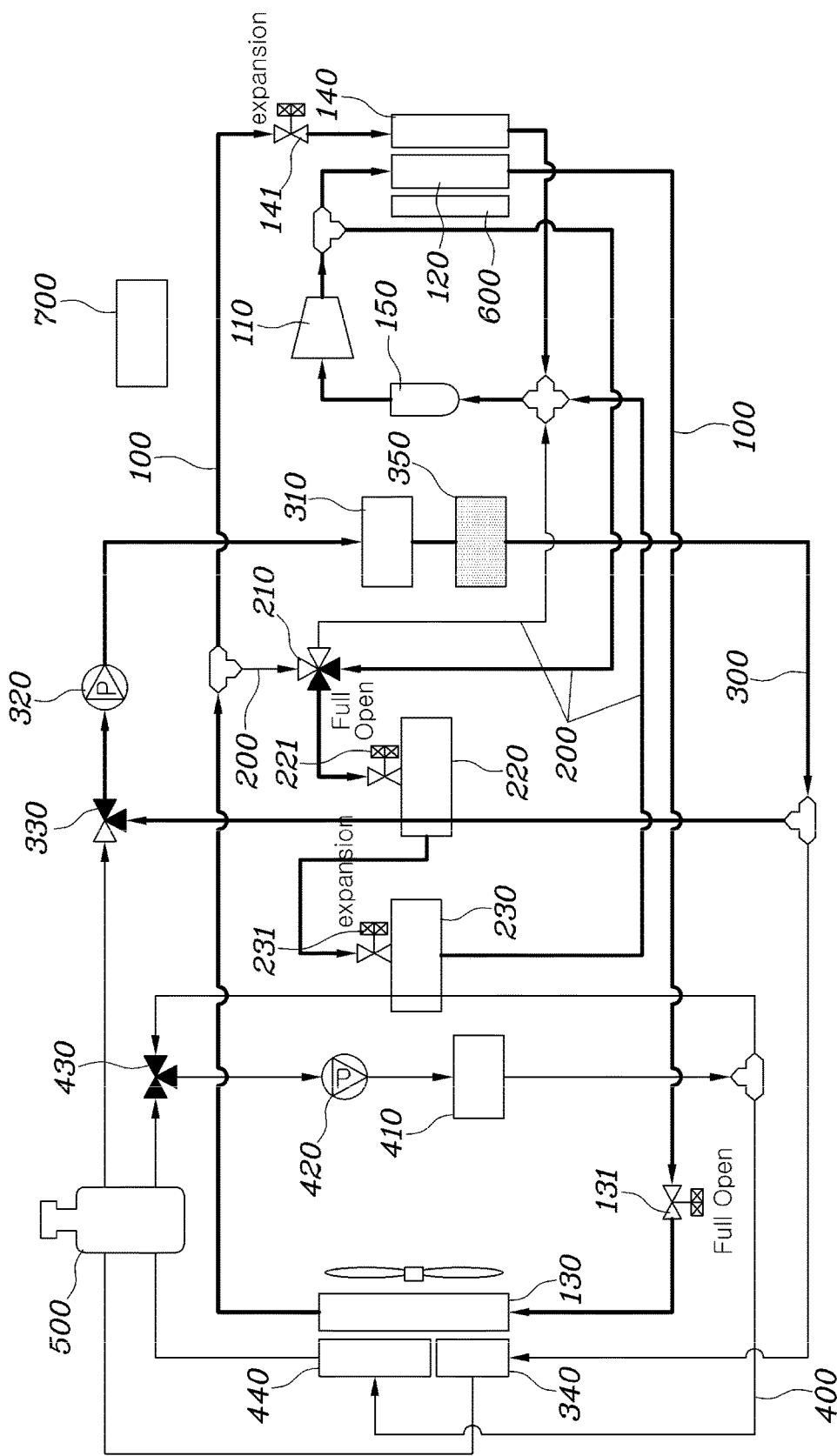
FIG. 16 shows another battery heating mode of the integrated thermal management system for the vehicle of FIG. 12 according to an embodiment of the present disclosure.
Figure 17:
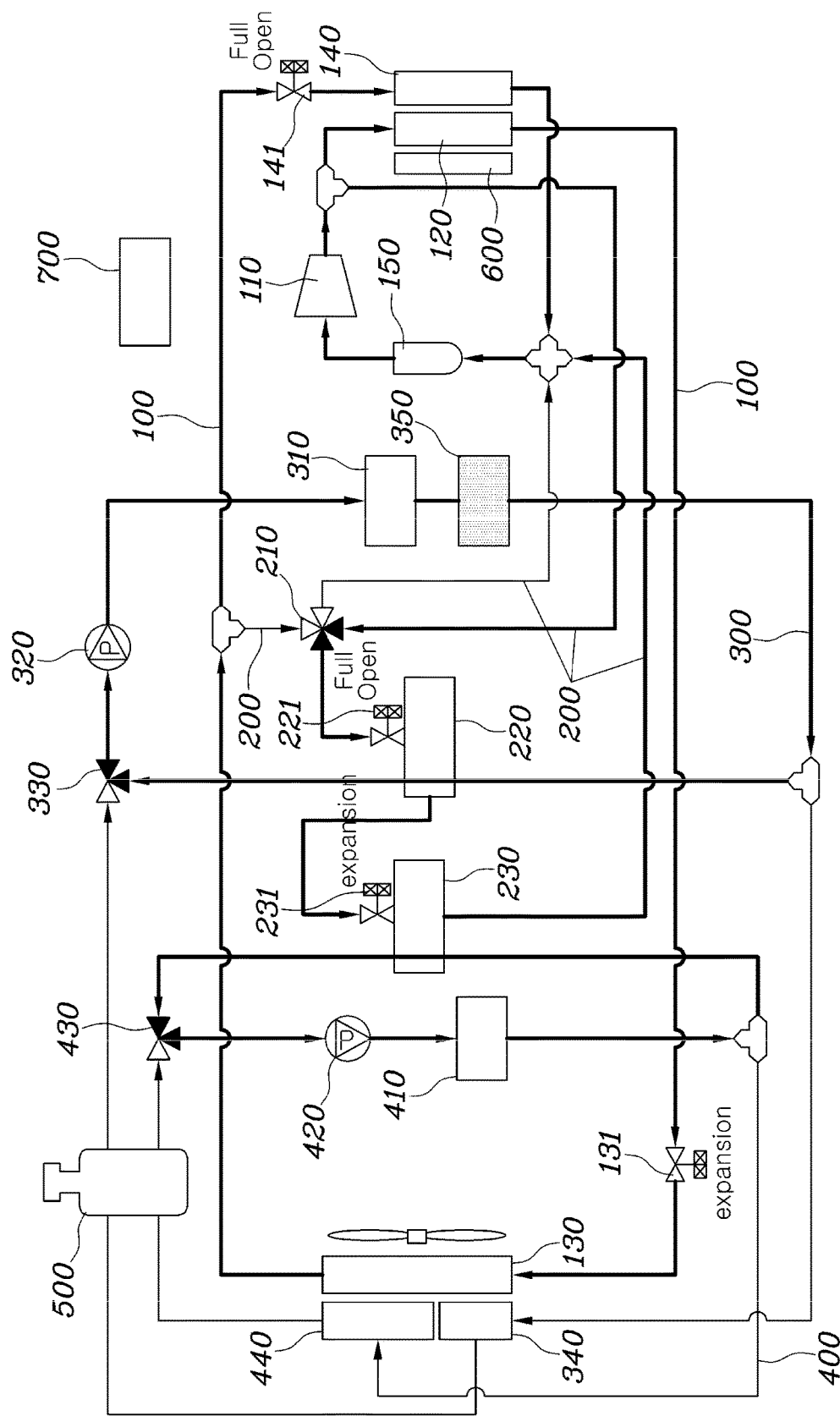
FIG. 17 shows another battery heating mode of the integrated thermal management system for the vehicle of FIG. 12 according to an embodiment of the present disclosure.

FIGS. 15 to 17 show the battery 310 heating mode of the integrated thermal management system for the vehicle according to another embodiment of the present disclosure.

Referring further to FIGS. 15 to 17, in the battery 310 heating mode, the controller 700 may permit flow of the coolant so that the coolant, passing through the battery 310 and being discharged therefrom in the battery cooling line 300, circulates while passing through the battery chiller 220, and may control the integrated valve 210 so that the refrigerant in the refrigerant flow line 100 flows into the refrigerant chiller line 200 by bypassing the indoor condenser 120 at the point downstream of the compressor 110 and is discharged to the refrigerant flow line 100 at the point upstream of the compressor 110 via the battery chiller 220 and the electric chiller 230 through the refrigerant chiller line 200.

That is, in the battery 310 heating mode, the controller 700 may control the integrated valve 210 so that the high-temperature/high-pressure refrigerant discharged from the compressor 110 on the refrigerant flow line 100 flows into the refrigerant flow line 100 through the indoor condenser 120 and also flows to the integrated valve 210 through the refrigerant chiller line 200 connected in parallel so as to join the refrigerant flow line 100 through the battery chiller 220 and the electric chiller 230 in the integrated valve 210.

In addition, in the battery 310 heating mode, the controller 700 may condense the refrigerant discharged from the compressor 110 on the refrigerant flow line 100 using the battery chiller 220, may expand the refrigerant in the fourth expansion valve 231 located at the point upstream of the electric chiller 230, and may cause the expanded refrigerant therein to flow back to the compressor 110.

Particularly, as shown in FIG. 15, the controller 700 may absorb the heat from the indoor air by expanding the refrigerant in the second expansion valve 141 located at the point upstream of the evaporator 140. In this case, the first expansion valve 131 may be in a fully open state.

As shown in FIG. 16, the controller 700 may absorb the heat from the outdoor air by expanding the refrigerant in the first expansion valve 131 located at the point upstream of the external condenser 130. In this case, the second expansion valve 141 may be in a fully open state.

In addition, as shown in FIG. 17, the controller 700 may expand the refrigerant in the first expansion valve 131 located at the point upstream of the external condenser 130. The controller 700 may simultaneously absorb the outdoor air and the waste heat of the electric component by driving the electric pump 420 to cause the coolant in the electric cooling line 400 to flow.

Figure 18:
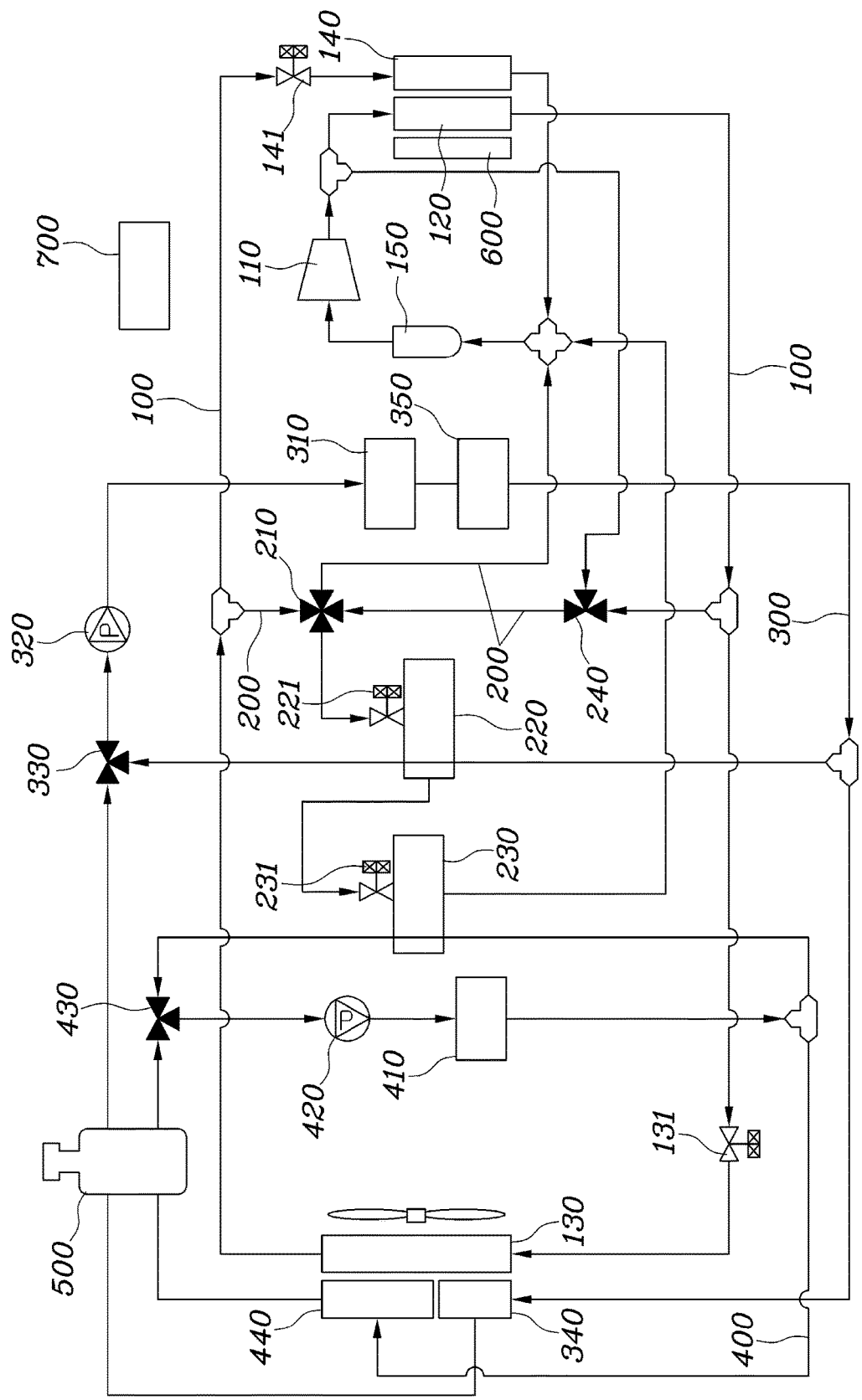
FIG. 18 shows another circuit diagram of an integrated thermal management system for a vehicle according to an embodiment of the present disclosure.

FIG. 18 is a circuit diagram of an integrated thermal management system for a vehicle according to still another embodiment of the present disclosure.

Referring further to FIG. 18, the refrigerant chiller line 200 of the integrated thermal management system for the vehicle according to still another embodiment of the present disclosure branches from the refrigerant flow line 100 at the point downstream of the compressor 110, the point downstream of the indoor condenser 120, and the point downstream of the external condenser 130, respectively. Further, the refrigerant, flowing in each of the refrigerant chiller lines 200 branching from the point downstream of the compressor 110 and the point downstream of the indoor condenser 120, joins the point upstream of the compressor 110 by selectively passing through or bypassing the battery chiller 220 and the electric chiller 230 through a series-parallel valve 240. Accordingly, the indoor condenser 120 may be selectively connected in series or in parallel with the battery chiller 220 and the electric chiller 230.

That is, the integrated thermal management system for the vehicle according to still another embodiment of the present disclosure, the refrigerant in the refrigerant flow line 100, passing through the indoor condenser 120, and the refrigerant in the refrigerant chiller line 200, branching from the point upstream of the indoor condenser 120 and bypassing the indoor condenser 120, may be connected to the series-parallel valve 240, thereby selectively flowing into the integrated valve 210 of the refrigerant chiller line 200. Accordingly, the indoor condenser 120 may be selectively connected in series or in parallel with the battery chiller 220 and the electric chiller 230 by the series-parallel valve 240.

Accordingly, it is possible to solve a problem of a series connection structure having insufficient heating amount of the battery 310 due to the indoor heating. In addition, it is also possible to solve problems of the parallel connection structure such as a problem in which waste heat absorption of the battery 310 cannot be performed because there is no condensation section at the point upstream of the battery chiller 220 when heat is absorbed from the outside air in an indoor heating control mode, and a problem in which indoor heating is difficult because the refrigerant cannot flow to the indoor condenser 120 when the waste heat of the electric component 410 is absorbed in the battery 310 heating mode.

In one embodiment, the series-parallel valve 240 may be a 3-Way valve, and the controller 700 may control the series-parallel valve 240 so that the refrigerant in the refrigerant flow line 100, passing through the indoor condenser 120, and the refrigerant in the refrigerant chiller line 200, bypassing the indoor condenser 120, selectively flow into the integrated valve 210.

In another embodiment, the series-parallel valve 240 may be a flow adjustment valve. Further, the controller 700 may control the series-parallel valve 240 so that the refrigerant in the refrigerant flow line 100, passing through the indoor condenser 120, and the refrigerant in the refrigerant chiller line 200, bypassing the indoor condenser 120, simultaneously flow into the integrated valve 210, and may adjust a flow rate therebetween through the series-parallel valve 240.

The refrigerant chiller line 200 includes the integrated valve 210, connected to the series-parallel valve 240 and the downstream point of the external condenser 130 so that the refrigerant in the refrigerant flow line 100 flows thereinto and connected to the point upstream of the compressor 110 by passing through or bypassing the battery chiller 220 and the electric chiller 230 so that the refrigerant flowing thereinto is discharged to the refrigerant flow line 100. The integrated thermal management system for the vehicle may further include the controller 700 configured to control the operation of the compressor 110, to control the integrated valve 210 to regulate the flow of the refrigerant in the refrigerant flow line 100 or the refrigerant chiller line 200, and to control the flow of the coolant in the battery cooling line 300 or the electric cooling line 400.

Figure 19:
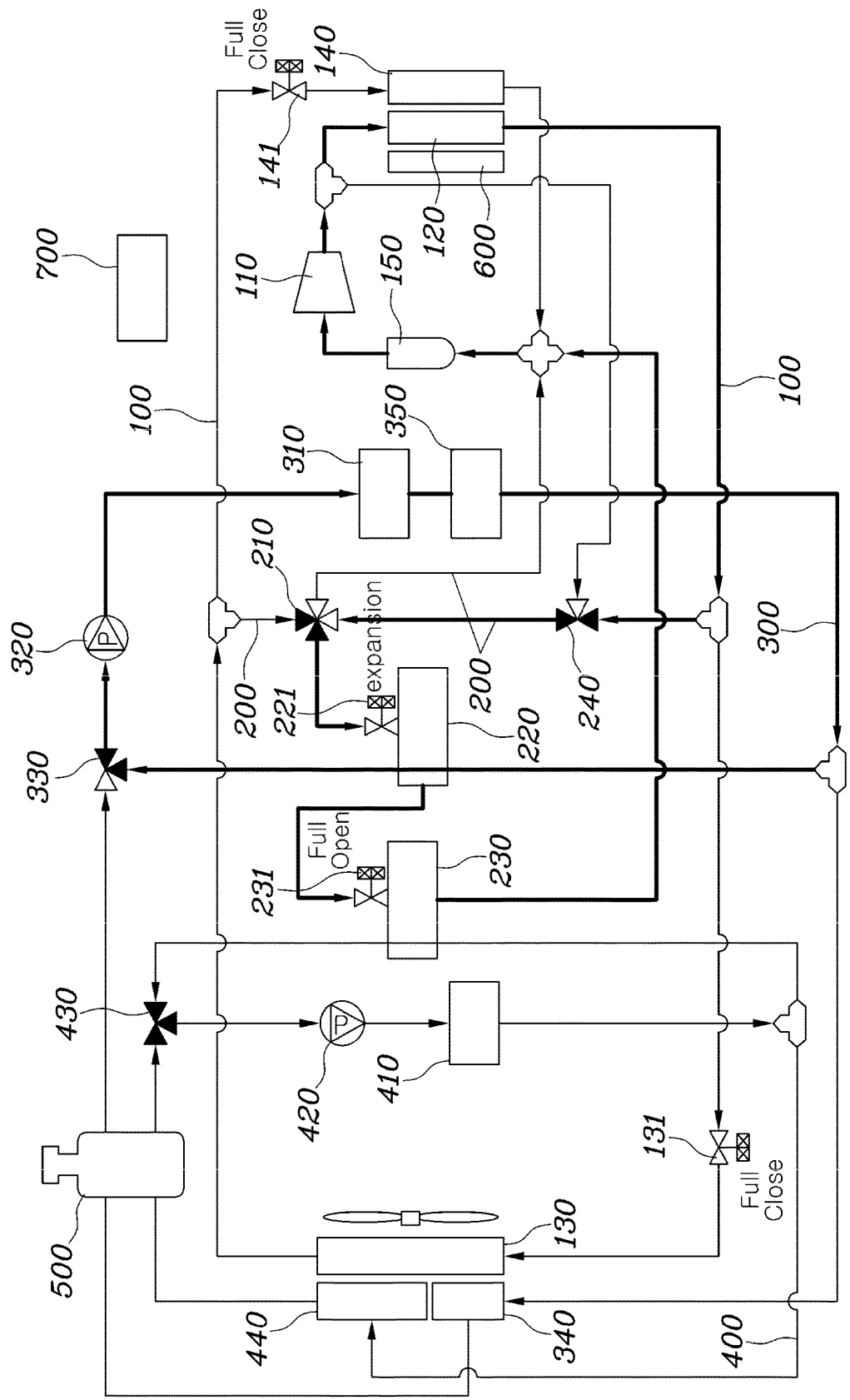
FIG. 19 shows an indoor heating mode of the integrated thermal management system for the vehicle of FIG. 18 according to an embodiment of the present disclosure.
Figure 20:
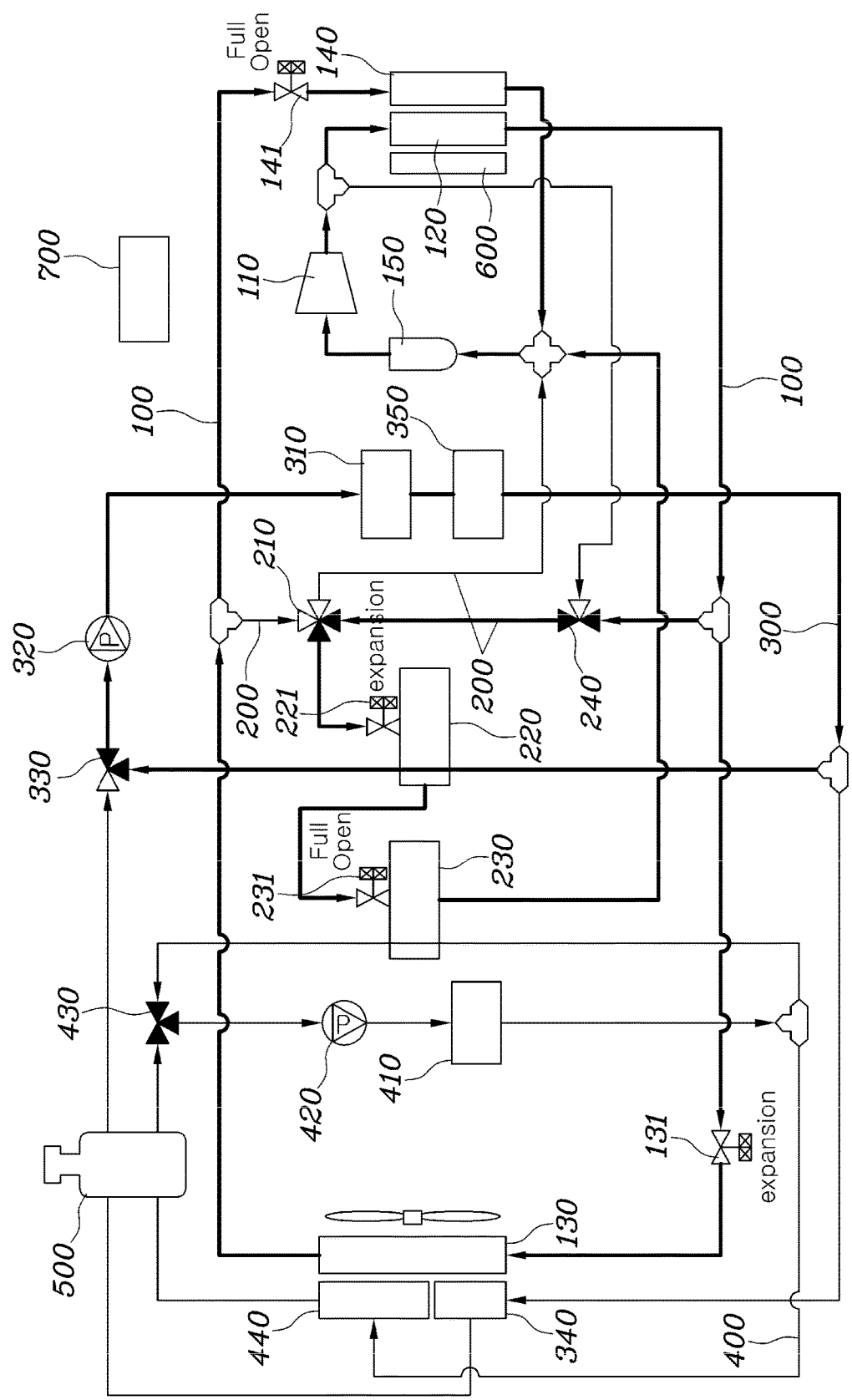
FIG. 20 shows another indoor heating mode of the integrated thermal management system for the vehicle of FIG. 18 according to an embodiment of the present disclosure.
Figure 21:
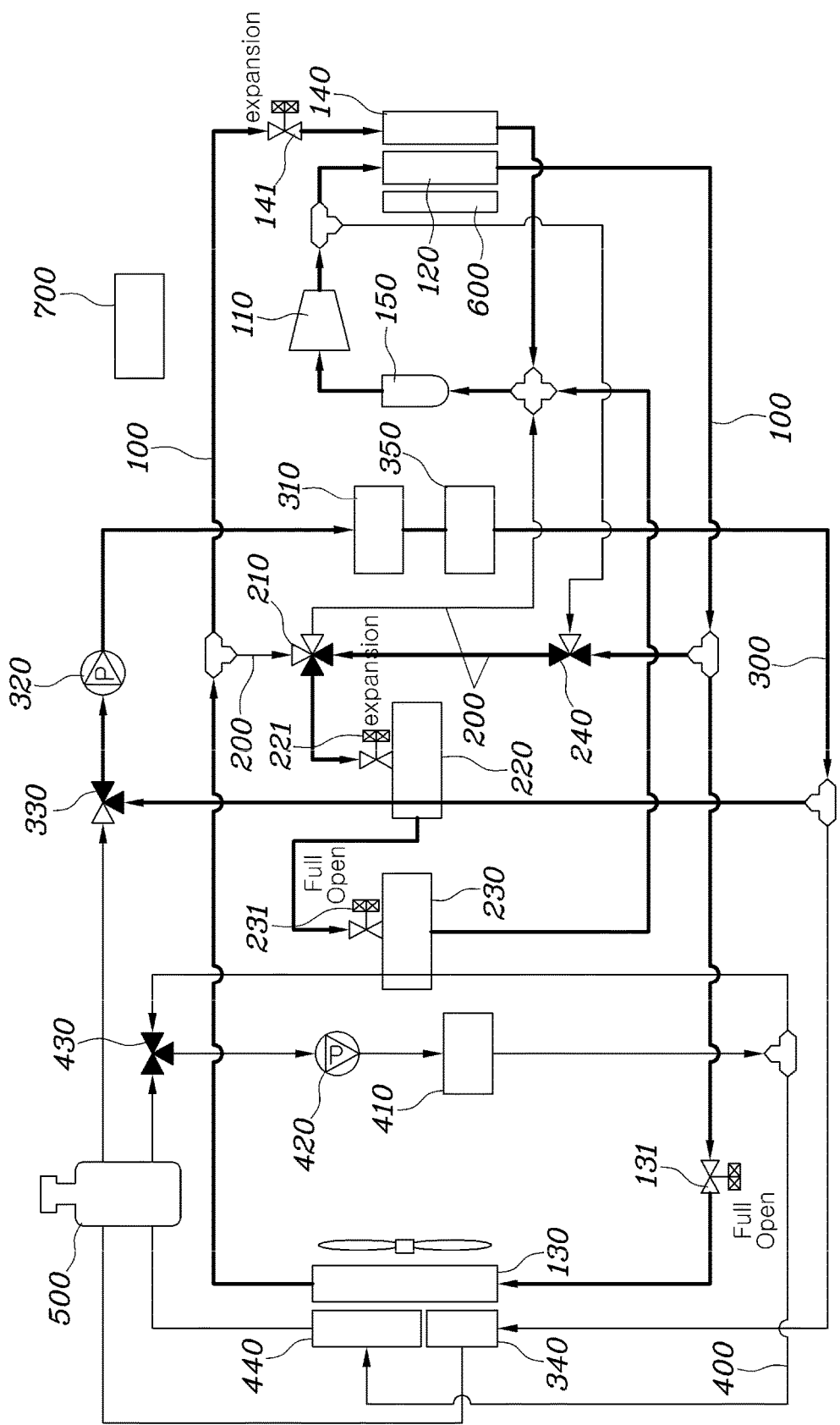
FIG. 21 shows another indoor heating mode of the integrated thermal management system for the vehicle of FIG. 18 according to an embodiment of the present disclosure.

FIGS. 19 to 21 show an indoor heating mode of the integrated thermal management system for the vehicle according to still another embodiment of the present disclosure.

Further referring to FIGS. 19 to 21, the integrated thermal management system for the vehicle according to still another embodiment of the present disclosure may heat the passenger compartment while absorbing the heat from the outside air, absorbing the waste heat of the battery 310, absorbing the waste heat of the electric component 410, or absorbing the heat from the indoor air.

As shown in FIG. 19, in the battery 310 waste heat absorption heating mode, the controller 700 may permit flow of the coolant so that the coolant, passing through the battery 310 and being discharged therefrom in the battery cooling line 300, circulates while passing through the battery chiller 220, may control the series-parallel valve 240 so that the refrigerant in the refrigerant flow line 100 flows into the refrigerant chiller line 200 at the point downstream of the indoor condenser 120, may control the integrated valve 210 so that the refrigerant, flowing thereinto through the series-parallel valve 240, is discharged to the refrigerant flow line 100 at the point upstream of the compressor 110 via the battery chiller 220 and the electric chiller 230, and may absorb the waste heat of the battery 310 by expanding the refrigerant at the point upstream of the battery chiller 220 on the refrigerant chiller line 200.

That is, in the battery 310 waste heat absorption heating mode, the controller 700 may control the series-parallel valve 240 so that the refrigerant in the refrigerant flow line 100, passing through the indoor condenser 120, flows into the integrated valve 210 through the refrigerant chiller line 200, thereby connecting the battery chiller 220 to the indoor condenser 120 in series.

Further, the controller 700 may control the integrated valve 210 so that the refrigerant, flowing thereinto through the refrigerant chiller line 200, flows into the battery chiller 220 and the electric chiller 230. The controller 700 may block the first expansion valve 131 and the second expansion valve 141, may expand the refrigerant in the third expansion valve 221 located at the point upstream of the battery chiller 220, and may control the fourth expansion valve 231 in a fully open state.

Particularly, as shown in FIGS. 20 and 21, the controller 700 may cause the refrigerant, discharged from the compressor 110 on the refrigerant flow line 100, to sequentially flow to the indoor condenser 120, the external condenser 130, and the evaporator 140, and may expand the refrigerant at the point upstream of the external condenser 130 or the point upstream of the evaporator 140 on the refrigerant flow line 100 to absorb the heat from the outside air or to absorb the heat from the indoor air.

As shown in FIG. 20, the controller 700 may heat the passenger compartment by absorbing the waste heat from the battery 310 and absorbing the heat from the outside air. Accordingly, it is possible to implement the indoor heating mode through absorption of waste heat from the battery 310 and absorption of heat from the outdoor air, which cannot be performed in the parallel structure.

Further, as shown in FIG. 21, the controller 700 may heat the passenger compartment by absorbing the waste heat from the battery 310 and absorbing the heat from the indoor air. Here, the indoor dehumidification mode may be implemented by cooling the passenger compartment according to the heat absorption by the evaporator 140 from the indoor air and by heating the passenger compartment through the indoor condenser 120.

Figure 22:
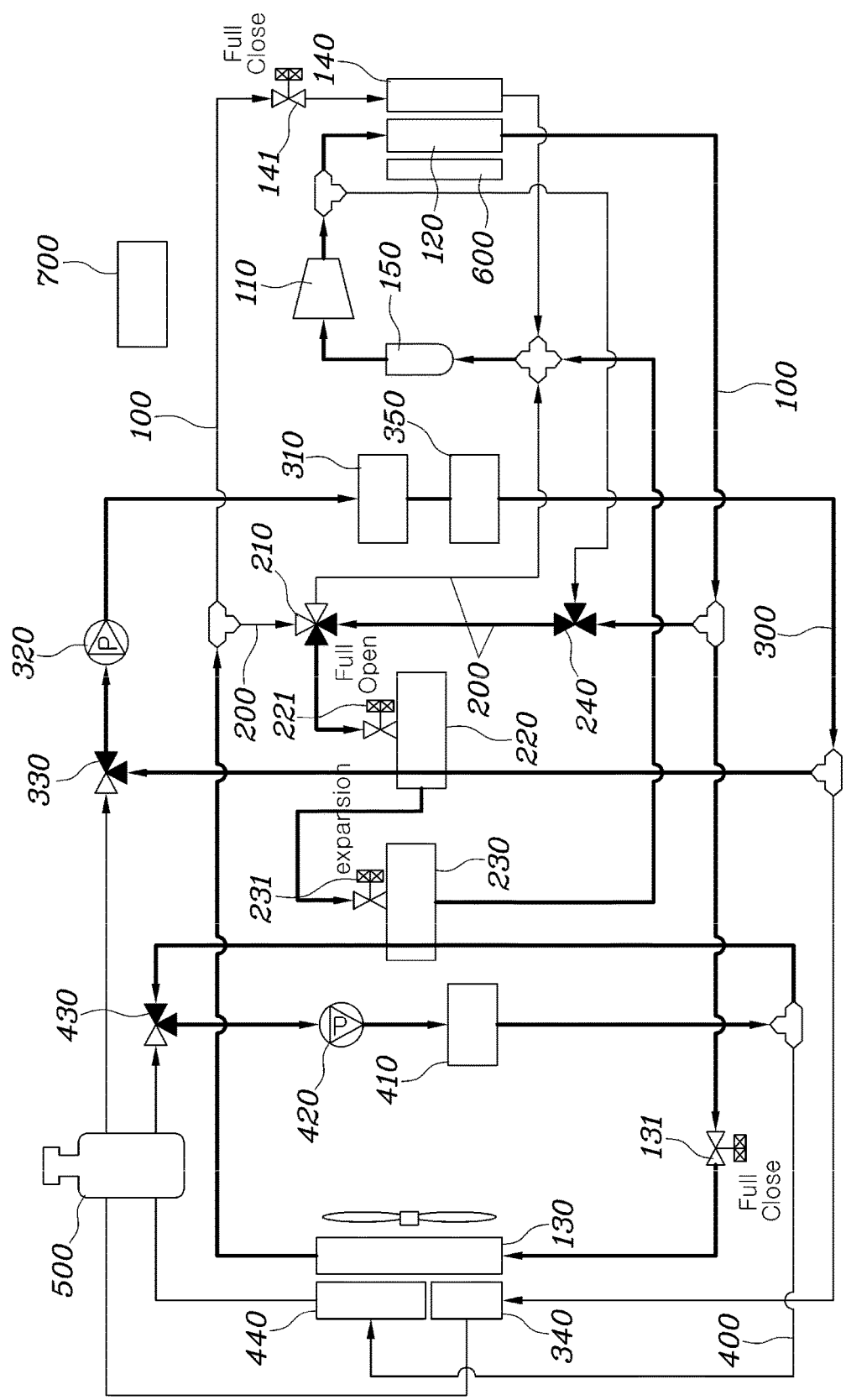
FIG. 22 shows an indoor battery heating mode of the integrated thermal management system for the vehicle of FIG. 18 according to an embodiment of the present disclosure.

FIG. 22 shows an indoor battery 310 heating mode of the integrated thermal management system for the vehicle according to still another embodiment of the present disclosure.

Referring further to FIG. 22, in the battery 310 heating mode, the controller 700 may permit flow of the coolant so that the coolant, passing through the battery 310 and being discharged therefrom in the battery cooling line 300, circulates while passing through the battery chiller 220, may control the series-parallel valve 240 so that the refrigerant in the refrigerant flow line 100 flows into the refrigerant chiller line 200 by bypassing the indoor condenser 120 at the point downstream of the compressor 110, may control the integrated valve 210 so that the refrigerant, flowing into the refrigerant chiller line 200 through the series-parallel valve 240, is discharged to the refrigerant flow line 100 at the point upstream of the compressor 110 via the battery chiller 220 and the electric chiller 230, and may absorb the waste heat of the electric component 410 by expanding the refrigerant at the point upstream of the electric chiller 230 on the refrigerant chiller line 200.

That is, the controller 700 may cause the coolant in the battery cooling line 300 to flow to the battery chiller 220 to raise the temperature of the battery 310, and may cause the refrigerant in the refrigerant flow line 100 to flow to the battery chiller 220 through the refrigerant chiller line 200.

Here, the controller 700 may control the integrated valve 210 so that the refrigerant, flowing thereinto from the series-parallel valve 240 through the refrigerant chiller line 200, flows to the battery chiller 220 and the electric chiller 230. In addition, the controller 700 may block the first expansion valve 131 and the second expansion valve 141, may control the third expansion valve 221 to be in a fully open state, and may control the fourth expansion valve 231 to expand the refrigerant.

More specifically, the controller 700 may permit flow of the coolant so that the coolant, passing through the electric component 410 and being discharged therefrom in the electric cooling line 400, circulates while passing through the electric chiller 230, may control the series-parallel valve 240 so that the refrigerant, discharged from the compressor 110 on the refrigerant flow line 100, flows into the refrigerant chiller line 200 through the indoor condenser 120, may control the integrated valve 210 so that the refrigerant, flowing into the refrigerant chiller line 200 through the series-parallel valve 240, is discharged to the refrigerant flow line 100 at the point upstream of the compressor 110 via the battery chiller 220 and the electric chiller 230, and may absorb the waste heat of the electric component 410 by expanding the refrigerant at the point upstream of the electric chiller 230 on the refrigerant chiller line 200.

Particularly, the controller 700 may cause the refrigerant to flow to the indoor condenser 120 for the indoor heating, and may control the series-parallel valve 240 so that the refrigerant, bypassing the indoor condenser 120 at the point downstream of the compressor 110, flows into the refrigerant chiller line 200 in order to secure the amount of heat needed to raise the temperature of the battery 310. That is, the series-parallel valves 240 is a flow adjustment valve, and the controller 700 may adjust a flow rate between the refrigerant in the refrigerant flow line 100, passing through the indoor condenser 120, and the refrigerant in the refrigerant chiller line 200, bypassing the indoor condenser 120.

In addition, the controller 700 may control the electric valve 430 while driving the electric pump 420 of the electric cooling line 400 to absorb the waste heat of the electric component 410, and may control the fourth expansion valve 231 located at the point upstream of the electric chiller 230 to expand the refrigerant.

As is apparent from the above description, an integrated thermal management system for a vehicle according to the present disclosure has an effect of implementing indoor heating of the vehicle using a heat pump even in a battery heating mode in which the temperature of a coolant in a battery cooling line is raised through a battery chiller. Accordingly, the integrated thermal management system for the vehicle has an effect of improving electricity consumption efficiency by minimizing the operation of a PTC heater during indoor heating of the vehicle.

Further, the battery chiller and an electric chiller are selectively connected in series or parallel with an indoor condenser to cause the refrigerant to flow, thereby having an effect of implementing various control modes including the battery heating mode.

Although the preferred embodiments of the present disclosure have been disclosed for illustrative purposes, those skilled in the art will appreciate that various modifications, additions and substitutions are possible, without departing from the scope and spirit of the present disclosure as disclosed in the accompanying claims.

What is claimed is:

1. An integrated thermal management system for a vehicle, comprising:
   a refrigerant flow line extending to allow a refrigerant discharged from a compressor to flow in an order of an indoor condenser, an external condenser, and an evaporator and to flow back to the compressor;
   a plurality of refrigerant chiller lines branching from the refrigerant flow line at a point downstream of the compressor, a point downstream of the indoor condenser, or a point downstream of the external condenser, the refrigerant chiller lines joining the refrigerant flow line at a point upstream of the compressor after the refrigerant, flowing in each of the refrigerant chiller lines branching therefrom, passes through a battery chiller and an electric chiller or bypasses the battery chiller and the electric chiller;
   a battery cooling line extending to allow a coolant, passing through a battery and being discharged therefrom, to circulate while passing through a battery radiator or the battery chiller; and
   an electric cooling line extending to allow the coolant, passing through an electric component and being discharged therefrom, to circulate while passing through an electric radiator or the electric chiller,
   wherein the refrigerant chiller lines comprise an integrated valve connected to the point downstream of the compressor, the point downstream of the indoor condenser, or the point downstream of the external condenser so that the refrigerant in the refrigerant flow line flows thereinto, and connected to the point upstream of the compressor by passing through or bypassing the battery chiller and the electric chiller so that the refrigerant flowing thereinto is discharged to the refrigerant flow line,
   wherein the system further comprises a controller configured to control operation of the compressor, to control the integrated valve to regulate flow of the refrigerant in the refrigerant flow line or the refrigerant chiller lines, and to control flow of the coolant in the battery cooling line or the electric cooling line, wherein the controller, in a battery waste heat absorption heating mode, permits flow of the coolant so that the coolant, passing through the battery and being discharged therefrom in the battery cooling line, circulates while passing through the battery chiller, controls the integrated valve so that the refrigerant in the refrigerant flow line flows into the refrigerant chiller lines at the point downstream of the indoor condenser or at the point downstream of the external condenser and is discharged to the refrigerant flow line at the point upstream of the compressor via the battery chiller and the electric chiller through the refrigerant chiller lines, and absorbs waste heat of the battery by expanding the refrigerant at a point upstream of the battery chiller on the refrigerant chiller lines.

2. The integrated thermal management system according to claim 1, wherein:
the refrigerant flow line comprises a first expansion valve configured to expand the refrigerant and to permit or block flow of the refrigerant at a point upstream of the external condenser, and a second expansion valve configured to expand the refrigerant and to permit or block flow of the refrigerant at a point upstream of the evaporator, and
the refrigerant chiller lines comprise a third expansion valve configured to expand the refrigerant and to permit or block flow of the refrigerant at a point upstream of the battery chiller, and a fourth expansion valve configured to expand the refrigerant and to permit or block flow of the refrigerant at a point upstream of the electric chiller.

3. The integrated thermal management system according to claim 1, wherein the controller, in a battery heating mode, permits flow of the coolant so that the coolant, passing through the battery and being discharged therefrom in the battery cooling line, circulates while passing through the battery chiller, and controls the integrated valve so that the refrigerant in the refrigerant flow line flows into the refrigerant chiller lines at the point downstream of the indoor condenser or at the point downstream of the compressor and is discharged to the refrigerant flow line at the point upstream of the compressor via the battery chiller and the electric chiller through the refrigerant chiller lines.

4. The integrated thermal management system according to claim 3, wherein the controller expands the refrigerant at a point upstream of the evaporator on the refrigerant flow line to absorb heat from indoor air, expands the refrigerant at a point upstream of the external condenser on the refrigerant flow line to absorb heat from outside air, or expands the refrigerant at a point upstream of the electric chiller on the refrigerant chiller lines to absorb waste heat of the electric component.

5. The integrated thermal management system according to claim 1, wherein the controller, in an electric waste heat absorption heating mode, permits flow of the coolant so that the coolant, passing through the electric component and being discharged therefrom in the electric cooling line, circulates while passing through the electric chiller, controls the integrated valve so that the refrigerant in the refrigerant flow line flows into the refrigerant chiller lines at the point downstream of the indoor condenser or at the point downstream of the external condenser and is discharged to the refrigerant flow line at the point upstream of the compressor via the battery chiller and the electric chiller through the refrigerant chiller lines, and absorbs waste heat of the electric component by expanding the refrigerant at a point upstream of the electric chiller on the refrigerant chiller lines.

6. The integrated thermal management system according to claim 1, wherein the controller, in an outdoor air heat absorption heating mode, controls the integrated valve so that the refrigerant in the refrigerant flow line flows into the refrigerant chiller lines at the point downstream of the external condenser and bypasses the battery chiller and the electric chiller through the refrigerant chiller lines to be discharged to the refrigerant flow line at the point upstream of the compressor, and absorbs heat from outside air by expanding the refrigerant at a point upstream of the external condenser on the refrigerant chiller flow line.

7. The integrated thermal management system according to claim 1, wherein the refrigerant chiller lines branch from the refrigerant flow line at the point downstream of the indoor condenser and the point downstream of the external condenser, respectively, and the refrigerant, flowing in each of the refrigerant chiller lines branching therefrom, joins the point upstream of the compressor by passing through or bypassing the battery chiller and the electric chiller, so that the indoor condenser is connected in series with the battery chiller and the electric chiller.

8. The integrated thermal management system according to claim 1, wherein the refrigerant chiller lines branch from the refrigerant flow line at the point downstream of the compressor and the point downstream of the external condenser, respectively, and the refrigerant, flowing in each of the refrigerant chiller lines branching therefrom, passes through or bypasses the battery chiller and the electric chiller to join the point upstream of the compressor, so that the indoor condenser is connected in parallel with the battery chiller and the electric chiller.

9. The integrated thermal management system according to claim 8, wherein the refrigerant chiller lines comprise an integrated valve connected to the point downstream of the compressor and the point downstream of the external condenser so that the refrigerant in the refrigerant flow line flows thereinto, and connected to the point upstream of the compressor by passing through or bypassing the battery chiller and the electric chiller so that the refrigerant flowing thereinto is discharged to the refrigerant flow line,
further comprising a controller configured to control operation of the compressor, to control the integrated valve to regulate flow of the refrigerant in the refrigerant flow line or the refrigerant chiller lines, and to control flow of the coolant in the battery cooling line or the electric cooling line,
wherein the controller, in a battery heating mode, permits flow of the coolant so that the coolant, passing through the battery and being discharged therefrom in the battery cooling line, circulates while passing through the battery chiller, and controls the integrated valve so that the refrigerant in the refrigerant flow line flows into the refrigerant chiller lines by bypassing the indoor condenser at the point downstream of the compressor and is discharged to the refrigerant flow line at the point upstream of the compressor via the battery chiller and the electric chiller through the refrigerant chiller lines.

10. The integrated thermal management system according to claim 1, wherein the refrigerant chiller lines branch from the refrigerant flow line at the point downstream of the compressor, the point downstream of the indoor condenser, and the point downstream of the external condenser, respectively, and the refrigerant, flowing in each of the refrigerant chiller lines branching from the point downstream of the compressor and the point downstream of the indoor condenser, joins the point upstream of the compressor by selectively passing through or bypassing the battery chiller and the electric chiller through a series-parallel valve, so that the indoor condenser is selectively connected in series or in parallel with the battery chiller and the electric chiller.

11. The integrated thermal management system according to claim 10, wherein the refrigerant chiller lines comprise an integrated valve connected to the series-parallel valve and the point downstream of the external condenser so that the refrigerant in the refrigerant flow line flows thereinto, and connected to the point upstream of the compressor by passing through or bypassing the battery chiller and the electric chiller so that the refrigerant flowing thereinto is discharged to the refrigerant flow line, further comprising a controller configured to control operation of the compressor, to control the integrated valve to regulate flow of the refrigerant in the refrigerant flow line or the refrigerant chiller lines, and to control flow of the coolant in the battery cooling line or the electric cooling line, wherein the controller, in a battery waste heat absorption heating mode, permits flow of the coolant so that the coolant, passing through the battery and being discharged therefrom in the battery cooling line, circulates while passing through the battery chiller, controls the series- parallel valve so that the refrigerant in the refrigerant flow line flows into the refrigerant chiller lines at the point downstream of the indoor condenser, controls the integrated valve so that the refrigerant, flowing thereinto through the series-parallel valve, is discharged to the refrigerant flow line at the point upstream of the compressor via the battery chiller and the electric chiller, and absorbs waste heat of the battery by expanding the refrigerant at a point upstream of the battery chiller on the refrigerant chiller lines.

12. The integrated thermal management system according to claim 11, wherein the controller causes the refrigerant discharged from the compressor on the refrigerant flow line to sequentially flow to the indoor condenser, the external condenser, and the evaporator, and expands the refrigerant at a point upstream of the external condenser or at a point upstream of the evaporator on the refrigerant flow line to absorb heat from outside air or to absorb heat from indoor air.

13. The integrated thermal management system according to claim 10, wherein the refrigerant chiller lines comprise an integrated valve connected to the series-parallel valve and the point downstream of the external condenser so that the refrigerant in the refrigerant flow line flows thereinto, and connected to the point upstream of the compressor by passing through or bypassing the battery chiller and the electric chiller so that the refrigerant flowing thereinto is discharged to the refrigerant flow line, further comprising a controller configured to control operation of the compressor, to control the integrated valve to regulate flow of the refrigerant in the refrigerant flow line or the refrigerant chiller lines, and to control flow of the coolant in the battery cooling line or the electric cooling line, wherein the controller, in a battery heating mode, permits flow of the coolant so that the coolant, passing through the battery and being discharged therefrom in the battery cooling line, circulates while passing through the battery chiller, controls the series-parallel valve so that the refrigerant in the refrigerant flow line flows into the refrigerant chiller lines by bypassing the indoor condenser at the point downstream of the compressor, controls the integrated valve so that the refrigerant, flowing into the refrigerant chiller lines through the series-parallel valve, is discharged to the refrigerant flow line at the point upstream of the compressor via the battery chiller and the electric chiller, and absorbs waste heat of the electric component by expanding the refrigerant at a point upstream of the electric chiller on the refrigerant chiller lines.

14. The integrated thermal management system according to claim 13, wherein the controller permits the flow of the coolant so that the coolant, passing through the electric component and being discharged therefrom in the electric cooling line, circulates while passing through the electric chiller, controls the series-parallel valve so that the refrigerant, discharged from the compressor on the refrigerant flow line, flows into the refrigerant chiller lines via the indoor condenser, controls the integrated valve so that the refrigerant, flowing into the refrigerant chiller lines through the series-parallel valve, is discharged to the refrigerant flow line at the point upstream of the compressor via the battery chiller and the electric chiller, and absorbs the waste heat of the electric component by expanding the refrigerant at the point upstream of the electric chiller on the refrigerant chiller lines.

* * * * *